(12) United States Patent  
Kadokawa et al.

(10) Patent No.: US 7,382,708 B2  
(45) Date of Patent: Jun. 3, 2008

(54) DATA RECORDING/REPRODUCING DEVICE

(75) Inventors: Yuichi Kadokawa, Kanagawa (JP); Akihiko Shimizu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/643,690

(22) Filed: Dec. 22, 2006

(65) Prior Publication Data

US 2007/0104067 A1    May 10, 2007

Related U.S. Application Data

(62) Division of application No. 10/682,523, filed on Oct. 10, 2003, now Pat. No. 7,190,653.

(30) Foreign Application Priority Data

| Oct. 21, 2002 | (JP) | ............................. | 2002-306263 |
| Oct. 22, 2002 | (JP) | ............................. | 2002-306802 |
| Nov. 20, 2002 | (JP) | ............................. | 2002-336901 |
| Feb. 17, 2003 | (JP) | ............................. | 2003-037817 |

(51) Int. Cl.  
*G11B 20/10*    (2006.01)

(52) U.S. Cl. ................. 369/59.24; 369/59.26

(58) Field of Classification Search .............. None  
See application file for complete search history.

(56) References Cited

U.S. PATENT DOCUMENTS 4,499,454 A * 2/1985 Shimada ................. 341/58  
4,620,311 A   10/1986 Schouhamer Immink  
4,626,826 A * 12/1986 Fukuda et al. ............. 341/58  
5,220,556 A    6/1993 Shimizu (Continued)

FOREIGN PATENT DOCUMENTS

EP    0 593 173 A    4/1994

(Continued)

OTHER PUBLICATIONS

Denic S. Z. et al . : M-ary RLL dc-free codes for optical recording channels,: Electronics Letters, IEE Stevenage, GB, vol. 36 No. 14, Jul. 6, 2000, pp. 1214-1216.

(Continued)

*Primary Examiner*—William Korzuch  
*Assistant Examiner*—Christopher Lamb  
(74) *Attorney, Agent, or Firm*—Dickstein Shapiro LLP

(57) ABSTRACT

A data recording device comprises a block division unit dividing a sequence of user data blocks into first blocks and second blocks, a plurality of multi-level data generating units generating multi-level data blocks from the first blocks and the second block, a group data storage unit storing first and second groups of code data corresponding to one user data block, a plurality of averaging units each calculating an average of DC levels based on the multi-level data of one of the blocks, a level comparison unit comparing each of the DC level averages with a predetermined value; a revision data generating unit generating a revision data using a result of the comparison, a data selection unit selecting one of the first and second groups of code data, and an output storage unit storing the first blocks, the second blocks generated using the selected code data, and the revision data.

8 Claims, 27 Drawing Sheets

U.S. PATENT DOCUMENTS

| | | | |
|---|---|---|---|
| 5,344,683 A | 9/1994 | Shimizu | |
| 5,414,720 A | 5/1995 | Kadokawa | |
| 5,420,844 A * | 5/1995 | Kawakubo et al. | 369/59.15 |
| 5,438,601 A | 8/1995 | Maegawa et al. | |
| 5,638,354 A | 6/1997 | Nakayama et al. | |
| 5,737,307 A | 4/1998 | Shimizu | |
| 5,812,520 A | 9/1998 | Nakayama et al. | |
| 5,822,286 A | 10/1998 | Nakayama et al. | |
| 5,926,446 A | 7/1999 | Shimizu | |
| 6,049,514 A * | 4/2000 | Todo | 369/47.25 |
| 6,127,100 A | 10/2000 | Shimizu | |
| 6,275,458 B1 | 8/2001 | Wong et al. | |
| 6,487,149 B1 | 11/2002 | Yokoi et al. | |
| 6,604,219 B1 | 8/2003 | Lee et al. | |
| 6,842,410 B1 | 1/2005 | Spielman et al. | |
| 2002/0021643 A1 | 2/2002 | Miura et al. | |
| 2002/0036978 A1 | 3/2002 | Shimizu | |
| 2002/0071380 A1 | 6/2002 | Shimizu | |
| 2003/0030719 A1 | 2/2003 | Shimizu | |
| 2003/0110444 A1 | 6/2003 | Sakagami et al. | |
| 2003/0112667 A1 | 6/2003 | Shimizu et al. | |
| 2004/0009371 A1 | 1/2004 | Sakagami et al. | |

FOREIGN PATENT DOCUMENTS

| | | |
|---|---|---|
| EP | 0 732 698 A | 9/1996 |
| EP | 0 757 347 A | 2/1997 |
| EP | 0 991 195 A | 4/2000 |
| EP | 1 115 108 A | 7/2001 |
| JP | 60-202568 A | 10/1985 |
| JP | 62 243426 A | 10/1987 |
| JP | 03 242026 A | 10/1991 |
| JP | 05-037389 A | 2/1993 |
| JP | 07-212238 | 8/1995 |
| JP | 08 161834 A | 6/1996 |
| JP | 08 161835 A | 6/1996 |
| JP | 2000-276809 | 10/2000 |
| JP | 2001 023304 A | 1/2001 |
| JP | 2002-135121 | 5/2002 |
| JP | 2002-342941 | 11/2002 |
| JP | 2003-016654 | 1/2003 |
| JP | 2003-45035 | 2/2003 |
| JP | 2003-196934 | 7/2003 |
| WO | WO 01/50461 A | 7/2001 |
| WO | WO 01/57857 A | 8/2001 |
| WO | WO 01/58102 A | 8/2001 |
| WO | WO 01/86817 A1 | 11/2001 |

OTHER PUBLICATIONS

Shimizu, Akihiko et al., "Data Detection Using Pattern Recognition for Multi-level Optical Recording", Office Systems R&D Center, pp. 300-301.

* cited by examiner

TEST PATTERN SIGNAL
↓
AD CONVERTER — S1
↓
WAVEFORM EQUALIZER — S2
↓
AVERAGE CALCULATION — S3
↓
CREATION OF LEARNING TABLE — S4

LEARNING TABLE

| No | i | j | k | Signal |
|---|---|---|---|---|
| 1 | 0 | 0 | 0 | T(0,0,0) |
| 2 | 0 | 1 | 0 | T(0,1,0) |
| 3 | 0 | 2 | 0 | T(0,2,0) |
| 4 | 0 | 3 | 0 | T(0,3,0) |
| 5 | 0 | 4 | 0 | T(0,4,0) |
| 6 | 0 | 5 | 0 | T(0,5,0) |
| 7 | 0 | 6 | 0 | T(0,6,0) ← AVERAGE OF "n" DATA |
| 8 | 0 | 7 | 0 | T(0,7,0) |
| 9 | 1 | 0 | 0 | T(1,0,0) |
| ⋮ | ⋮ | ⋮ | ⋮ | ⋮ |
| 511 | 7 | 6 | 7 | T(7,6,7) |
| 512 | 7 | 7 | 7 | T(7,7,7) |

FIG.7

| USER DATA | CODE GROUP A BLOCK S1 | S2 | S3 | S4 | AVERAGE DC LEVEL |
|---|---|---|---|---|---|
| 0 | 1 | 1 | 1 | 1 | 1.0 |
| 1 | 1 | 1 | 1 | 3 | 1.5 |
| 2 | 1 | 1 | 1 | 5 | 2.0 |
| 3 | 1 | 1 | 1 | 7 | 2.5 |
| 4 | 1 | 1 | 3 | 1 | 1.5 |
| 5 | 1 | 1 | 3 | 3 | 2.0 |
| 6 | 1 | 1 | 3 | 5 | 2.5 |
| 7 | 1 | 1 | 3 | 7 | 3.0 |
| 8 | 1 | 1 | 5 | 1 | 2.0 |
| 9 | 1 | 1 | 5 | 3 | 2.5 |
| 10 | 1 | 1 | 5 | 5 | 3.0 |
| 11 | 1 | 1 | 5 | 7 | 3.5 |
| 12 | 1 | 1 | 7 | 1 | 2.5 |
| 13 | 1 | 1 | 7 | 3 | 3.0 |
| 14 | 1 | 1 | 7 | 5 | 3.5 |
| 15 | 1 | 1 | 7 | 7 | 4.0 |
| 16 | 1 | 3 | 1 | 1 | 1.5 |
| 17 | 1 | 3 | 1 | 3 | 2.0 |

(OMITTED)

| USER DATA | S1 | S2 | S3 | S4 | AVERAGE DC LEVEL |
|---|---|---|---|---|---|
| 2036 | 6 | 6 | 2 | 0 | 3.5 |
| 2037 | 6 | 6 | 2 | 2 | 4.0 |
| 2038 | 6 | 6 | 2 | 4 | 4.5 |
| 2039 | 6 | 6 | 2 | 6 | 5.0 |
| 2040 | 6 | 6 | 4 | 0 | 4.0 |
| 2041 | 6 | 6 | 4 | 2 | 4.5 |
| 2042 | 6 | 6 | 4 | 4 | 5.0 |
| 2043 | 6 | 6 | 4 | 6 | 5.5 |
| 2044 | 6 | 6 | 6 | 0 | 4.5 |
| 2045 | 6 | 6 | 6 | 2 | 5.0 |
| 2046 | 6 | 6 | 6 | 4 | 5.5 |
| 2047 | 6 | 6 | 6 | 6 | 6.0 |

| USER DATA | CODE GROUP B BLOCK S1 | S2 | S3 | S4 | AVERAGE DC LEVEL |
|---|---|---|---|---|---|
| 0 | 6 | 6 | 6 | 7 | 6.3 |
| 1 | 6 | 6 | 6 | 5 | 5.8 |
| 2 | 6 | 6 | 6 | 3 | 5.3 |
| 3 | 6 | 6 | 6 | 1 | 4.8 |
| 4 | 6 | 6 | 4 | 7 | 5.8 |
| 5 | 6 | 6 | 4 | 5 | 5.3 |
| 6 | 6 | 6 | 4 | 3 | 4.8 |
| 7 | 6 | 6 | 4 | 1 | 4.3 |
| 8 | 6 | 6 | 2 | 7 | 5.3 |
| 9 | 6 | 6 | 2 | 5 | 4.8 |
| 10 | 6 | 6 | 2 | 3 | 4.3 |
| 11 | 6 | 6 | 2 | 1 | 3.8 |
| 12 | 6 | 6 | 0 | 7 | 4.8 |
| 13 | 6 | 6 | 0 | 5 | 4.3 |
| 14 | 6 | 6 | 0 | 3 | 3.8 |
| 15 | 6 | 6 | 0 | 1 | 3.3 |
| 16 | 6 | 4 | 6 | 7 | 5.8 |
| 17 | 6 | 4 | 6 | 5 | 5.3 |

(OMITTED)

| USER DATA | S1 | S2 | S3 | S4 | AVERAGE DC LEVEL |
|---|---|---|---|---|---|
| 2036 | 1 | 1 | 5 | 6 | 3.3 |
| 2037 | 1 | 1 | 5 | 4 | 2.8 |
| 2038 | 1 | 1 | 5 | 2 | 2.3 |
| 2039 | 1 | 1 | 5 | 0 | 1.8 |
| 2040 | 1 | 1 | 3 | 6 | 2.8 |
| 2041 | 1 | 1 | 3 | 4 | 2.3 |
| 2042 | 1 | 1 | 3 | 2 | 1.8 |
| 2043 | 1 | 1 | 3 | 0 | 1.3 |
| 2044 | 1 | 1 | 1 | 6 | 2.3 |
| 2045 | 1 | 1 | 1 | 4 | 1.8 |
| 2046 | 1 | 1 | 1 | 2 | 1.3 |
| 2047 | 1 | 1 | 1 | 0 | 0.8 |

(a) DATA BEFORE LLM

| D1 | D2 | D3 | D4 | D5 | D6 | D7 | D8 | D9 | D10 | D11 |

P1, P2, P3, AND P4 ARE CALCULATED FROM D9, D10, AND D11

(b) DATA AFTER LLM

MSB
| D1 | D2 | D3 | D4 |
| D5 | D6 | D7 | D8 |
LSB
| P1 | P2 | P3 | P4 |

(a) DATA BEFORE LLM   | D1 | D2 | D3 | D4 | D5 | D6 | D7 | D8 | D9 | D10 |

P1, P2, P3, AND P4 ARE
CALCULATED FROM
D8, D9, AND D10

$M1 = D1\ \text{EXOR}\ F$
$M2 = D2\ \text{EXOR}\ F$
$M3 = D3\ \text{EXOR}\ F$
$M4 = D4\ \text{EXOR}\ F$
$M5 = D5\ \text{EXOR}\ F$
$M6 = D6\ \text{EXOR}\ F$
$M7 = D7\ \text{EXOR}\ F$ (b) DATA AFTER LLM

|     | | | |
|-----|---|---|---|
| MSB (M1 | M2 | M3 | F |
| M4 | M5 | M6 | M7 |
| LSB P1 | P2 | P3 | P4) |

DATA RECORDING/REPRODUCING DEVICE

This is a divisional application of application Ser. No. 10/682,523 filed Oct. 10, 2003 now U.S. Pat. No. 7,190,653, which claims priority to JP 2002-306263, filed Oct. 21, 2002; JP 2002-306802, filed Oct. 22, 2002; JP 2002-336901, filed Nov. 20, 2002; and JP 2003-037817, filed Feb. 17, 2003, the entire disclosures of which we hereby incorporated in the entireties.

BACKGROUND OF THE INVENTION

1. Field of the Invention

The present invention generally relates to a data recording/reproducing device, and more particularly to a data recording/reproducing device in which a multi-level data is recorded to a recording medium while suppressing the DC components, and the multi-level data is reproduced from the recording medium.

2. Description of the Related Art

Japanese Laid-Open Patent Application No. 2002-342941 discloses a recording medium which is provided with a wobbling of a track suitable for a high recording density.

In the recording medium, the wobbling is formed so that an FSK information bit part based on the waveform subjected to FSK modulation for an information bit and a single frequency part based on the waveform of a single frequency are made to be specified units, and such specified units are continuous. Two frequencies are used in the FSK modulation: one frequency being the same frequency as the single frequency and the other frequency being different from the single frequency. The relation between the two frequencies is arranged so that the even-numbered wave and the odd-numbered wave are contained in a certain specified period.

A multi-level data recording method which is intended to increase the recording density on a recording medium and records a multi-level data with three or more levels to the recording medium is known. In the case of optical disks, the read-out signal of multi-level data has the level fluctuations and amplitude fluctuations due to the difference in the reflective index between the optical disks and the difference in the reproducing frequency characteristics between the inner tracks and the outer tracks of one optical disk.

In the multi-level data recording method, it is likely that the read-out signal is erroneously detected as being a wrong value of the multi-level data because of the above problem when the threshold values for generating the multi-level data are fixed.

To eliminate the problem, Japanese Laid-Open Patent Application No. 2002-135121 discloses the method of modulation and demodulation of RLL (run length limited) codes in which the DC components of the codeword stream using the RLL codes are suppressed.

In the modulation/demodulation method, the modulation of input data is performed using the code group for DC level suppression in addition to the code group for multi-level data generation.

In addition, Japanese Laid-Open Patent Application No. 2003-045035 and Japanese Laid-Open Patent Application No. 2003-196934, which are assigned to the assignee of the present application, disclose the method of determination of multi-level data as the background technology related to the present invention.

If the data signal after modulation comes out in the frequencies of the servo signal band, the resulting data will affect the servo signal. To eliminate the problem, the modulation is improved by the conventional modulation method so that the data signal after modulation does not come out in the frequencies of the servo signal band.

However, the conventional method causes the efficiency of the transformation of codes to deteriorate. In the case of the multi-level data, many additional information bits are needed in order to control the low-frequency components of the signal, which causes the storage capacity of the recording medium to be decreased significantly.

Moreover, in the case of the method disclosed in Japanese Laid-Open Patent Application No. 2002-135121, the amount of redundant information is increased when the DC suppression control is increasingly performed, and there is the problem in that the storage capacity of the recording medium is decreased because of the increasing amount of the redundant information.

SUMMARY OF THE INVENTION

An object of the present invention is to provide an improved data recording/reproducing device in which the above-described problems are eliminated.

Another object of the present invention is to provide a data recording/reproducing device which is able to minimize the undesired influences of the data signal in the servo signal frequency range with a small amount of the additional information used.

Another object of the present invention is to provide a data recording/reproducing method which is able to minimize the undesired influences of the data signal in the servo signal frequency range with a small amount of the additional information used.

The above-mentioned objects of the present invention are achieved by a data recording device which records a multi-level data to a recording medium, the data recording device comprising: a block division unit dividing a sequence of input user data blocks into first blocks and second blocks; a plurality of multi-level data generating units generating multi-level data blocks from both the first blocks and the second blocks output from the block division unit; a group data storage unit storing two or more groups of code data corresponding to one user data block; a plurality of averaging units each calculating an average of DC levels based on the multi-level data of one of the blocks output from the plurality of multi-level data generating units; a level comparison unit comparing each of the DC level averages output from the plurality of averaging units with a predetermined value; a revision data generating unit generating a revision data using a result of the comparison by the level comparison unit; a data selection unit selecting one of the plurality of the groups of code data stored in the group data storage unit; and an output storage unit storing the multi-level data of the first blocks, and the multi-level data of the second blocks generated with the code data of the group selected by the data selection unit, in addition to the revision data output from the revision data generating unit.

The above-mentioned objects of the present invention are achieved by a data recording device which records a multi-level data to a recording medium, the data recording device comprising: a modulator modulating the multi-level data into two or more data blocks; an inverter reversing a most significant bit of each data block output from the modulator; a first DC level calculation unit computing a DC level contained in each data block output from the modulator; a second DC level calculation unit computing a DC level contained in each data block output from the inverter; a DC level accumulation unit accumulating the DC levels from the first and second DC level calculation units; and a level determination unit determining a smaller value of the DC levels from the first and second DC level calculation units, wherein the level determination unit determines a smaller one of a sum of the DC level from the first DC level calculation unit and the accumulated value from the DC level accumulation unit and a sum of the DC level from the second DC level calculation unit and the accumulated value, the smaller one of the sums is selected so that the selected sum is output to the DC level accumulation unit as a new DC level, and, one of the output data block of the modulator and the output data block of the inverter is selected based on the determination so that the selected data block is output.

The above-mentioned objects of the present invention are achieved by a data recording/reproducing method, comprising the steps of: calculating accumulation values by adding two or more random numbers to a data respectively; selecting a random number used from among the respective random number based on each of the accumulation values; and recording both random number information indicating the selected random number, and a corresponding accumulation value in which the selected random number is added to the data to a recording medium.

The above-mentioned objects of the present invention are achieved by a data recording/reproducing method, comprising the steps of: transforming a multi-level data into a signal sequence; suppressing a component of a specific band of the signal sequence while suppressing a low-pass frequency of the signal sequence; and recording the resulting information to a recording medium.

According to one aspect of the present invention, by the selection of one of the two code groups that can be used as the user data, the DC level variation can be suppressed, and high encoding efficiency can be maintained without adding the unnecessary DC level correction data.

According to one aspect of the present invention, the MSB that has the main influenced on the DC level fluctuation is reversed and the lower DC level is selected by the DC level determination unit, and the DC level fluctuation can be reduced.

According to one aspect of the present invention, the multi-level data can be recorded on the recording medium without lowering the efficiency of coding at the time of reproduction as the formation of the signal of the servo band can be lessened. Moreover, according to the data reproducing method of the present invention, the formation of the signal of the servo band can be lessened without lowering the efficiency of coding by adding little information to the multi-level data recorded to the recording medium.

According to one aspect of the present invention, when recording the multi-level data to the recording medium, it is possible to record data that can be correctly reproduced without adding too many items of additional information. Moreover, by the data reproducing of the present invention, the information recorded by the data recording method of the present invention can be easily reproduced.

BRIEF DESCRIPTION OF THE DRAWINGS

Other objects, features and advantages of the present invention will be apparent from the following detailed description when read in conjunction with the accompanying drawings.

FIG. 7 is a diagram for explaining an example of the code group parameters for the DC level suppressing control for a user data block.

DETAILED DESCRIPTION OF PREFERRED EMBODIMENTS

A description will now be provided of the preferred embodiments of the invention with reference to the accompanying drawings.

Figure 1:
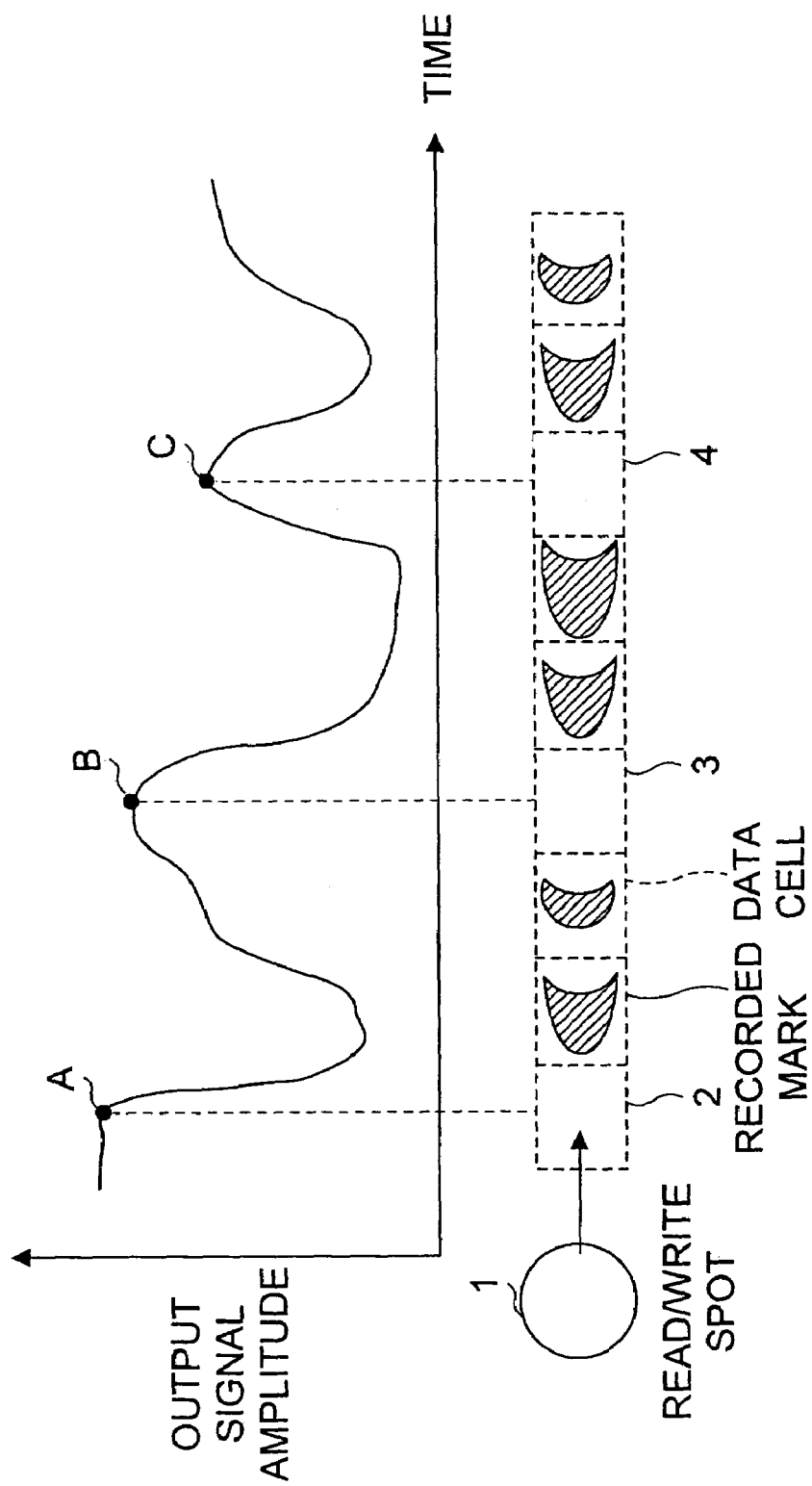
FIG. 1 is a diagram for explaining the waveform of a read-out signal of multi-level data obtained from an optical recording medium.

FIG. 1 shows the waveform of a read-out signal of multi-level data obtained from an optical recording medium.

The multi-level signal is recoded to the recording medium by irradiating a focused light beam to the recording medium to form a read/write spot 1 thereon and record marks thereon. The waveform of the read-out signal of such multi-level data, obtained from the recording medium, is represented by the time versus output signal amplitude characteristics as shown in FIG. 1.

As shown in FIG. 1, the area factor of the pulse duty of the recorded mark per unit area (which is called a data cell) is changed (the area modulation), and the recording of the multi-level signal to the recording medium is attained.

For example, if the data cells 2, 3, and 4 in which the recorded mark does not exist are reproduced with the read/write spot 1, the reproduction waveform becomes like the points A, B, and C. Even if the same information is reproduced, the output signal amplitude of the read-out signal will differ.

It is known that the output signal amplitude varies depending on the area factor for each of the recorded marks before and after the data cells in which the recorded mark does not exist.

However, the recording of eight-level data per pixel is attained by making the area factor of the pulse duty into eight different tone levels including the level where the mark does not exist.

Figure 2:
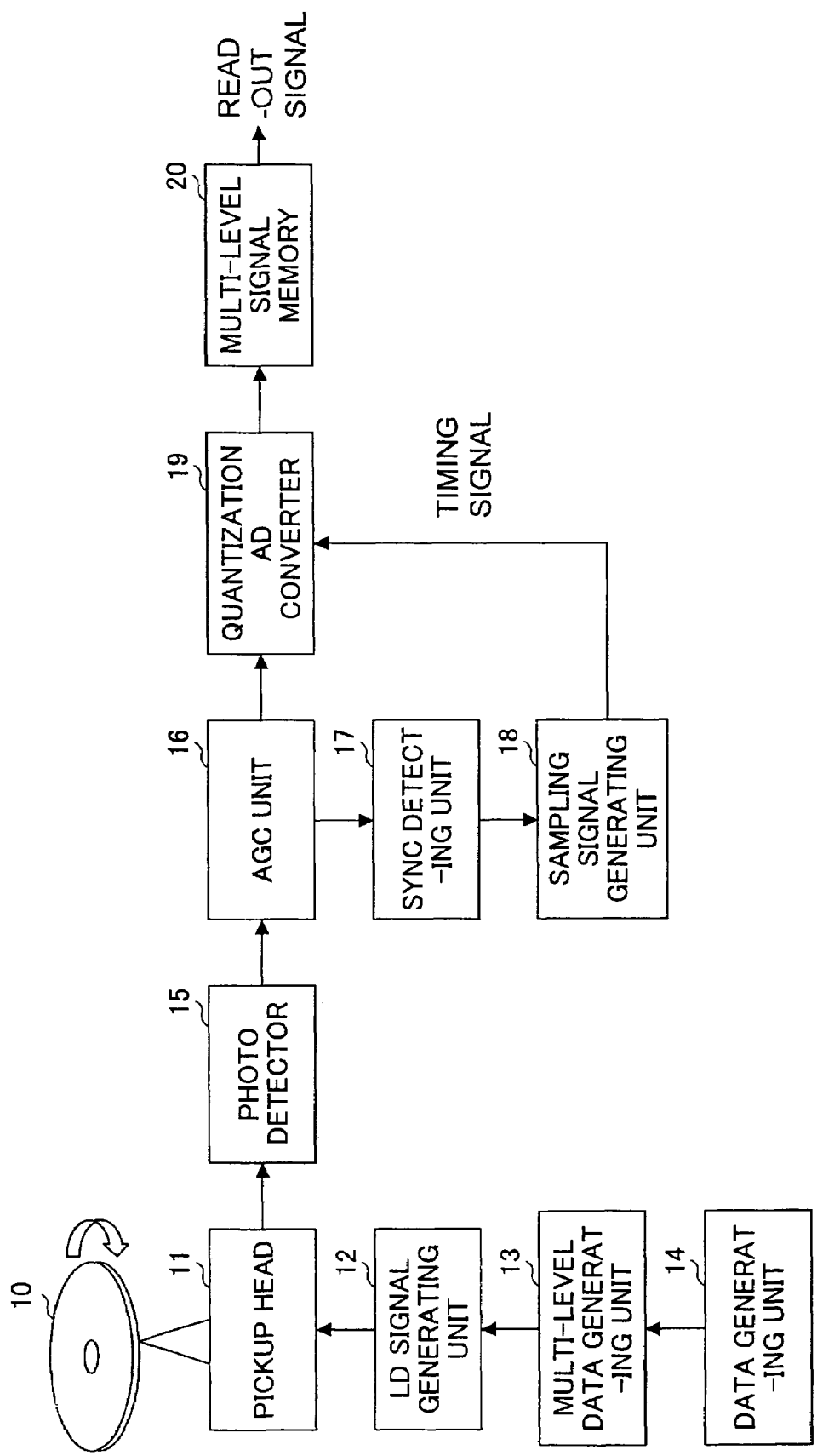
FIG. 2 is a block diagram of a data recording/reproducing device for use in an optical disk drive.

FIG. 2 shows a data recording/reproducing device for use in an optical disk drive. The data recording/reproducing device in one preferred embodiment of the present invention is configured to realize recording and reproduction of the multi-level data using the optical disk drive.

In the following description, the optical disk is considered a typical example of a recording medium. However, the present invention is not limited to the optical disk recording/reproducing device, and it is also applicable to other recording/reproducing methods using the magneto-optical recording media, the write-once and read-many media, other rewritable media, etc. Moreover, the composition of FIG. 2 is the minimum composition required for the description.

The data recording/reproducing device of FIG. 2 includes an optical disk 10, a pickup head 11, an LD signal generating unit 12, a multi-level data generating unit 13, a data generating unit 14, a photodetector 15, an AGC (automatic gain control) unit 16, a sync detecting unit 17, a sampling signal generating unit 18, a quantization AD (analog-to-digital) converter 19, and a multi-level signal memory 20.

The optical disk 10 stores the multi-level data recorded by the data recording/reproducing device. The pickup head 11 irradiates the light beam carrying optical information to the optical disk 10. The LD signal generating unit 12 generates the recording pulse for performing the recording in the area modulation corresponding to the transformed multi-level data, to the pickup head 11. The multi-level data generating unit 13 transforms the user data into the multi-level data. The data generating unit 14 generates information data from the user data.

The photodetector 15 transforms the reflection light beam from the recording medium 10 into an electrical signal through the photoelectric conversion. The AGC unit 16 controls the gain of the output signal so that the output signal amplitude of the pilot mark is maintained at a fixed level. The sync detecting unit 17 detects the sync signal (not shown) that is recorded together with the multi-level data at the fixed period. The sampling signal generating unit 18 generates the timing-signal based on the sync signal detected by the sync detecting unit 17. The quantization AD converter 19 quantizes the output signal of the photodetector 15 into the multi-level signal. The multi-level signal memory 20 sequentially stores the multi-level signal one by one.

When the multi-level data is recorded to the optical disk 10, the user data which is externally supplied to the data generating unit 14 is transformed into the multi-level data by the multi-level data generating unit 13. The LD signal generating unit 12 generates the recording pulse for performing the recording in the area modulation corresponding to the transformed multi-level data, to the pickup head 11. The pickup head 11 irradiates the focused light beam carrying the information to the recording surface of the optical disk 10 so that the multi-level data is recorded.

When the multi-level data is reproduced from the optical disk 10, the laser beam is focused onto the rotating optical disk 10. The photoelectric conversion of the reflected light beam from the optical disk 10 is carried out by the photodetector 15. The photodetector 15 outputs the electrical signal as the reproduced signal.

The pilot mark, which is recorded together with the multi-level data at a fixed period in order to correct the reproduced-signal fluctuation by the disturbance, is detected from the reproduced signal, and the AGC unit 16 controls the gain of the output signal so that the output signal amplitude of the pilot mark is maintained at a fixed level. The AGC unit 16 is provided for correcting the reproduced signal in order to prevent the error in the multi-level determination due to the reflection factor fluctuation of the optical disk 10.

Next, in order to quantize the reproduced signal (or in order to sample, hold and quantize the reproduced signal in conformity with the center of the data cell shown in FIG. 1), the sync signal (not shown) which is recorded together with the multi-level data at the fixed period is detected by the sync-signal detector 17. The sampling signal generating unit 18 generates the timing signal to the quantization AD converter 19 based on the detected sync signal.

By receiving the timing signal, the multi-level signal is quantized by the quantization AD converter 19 (in order to sample and hold the reproduced signal at the center of the data cell), and the multi-level signal is stored into the multi-level signal memory 20 one by one.

The signal stored in the multi-level signal memory 20 is read out one by one, and the quantized reproduced signal is used for the waveform equalization or the multi-level determination which is the subsequent signal processing.

Next, a description will be given of the calculation method of the reproduced multi-level signal and the multi-level data candidate.

As previously described, the method of determination of the multi-level data is disclosed in Laid-Open patent application No. 2003-045035 and Japanese Laid-Open Patent Application No. 2003-196934.

Figure 3:
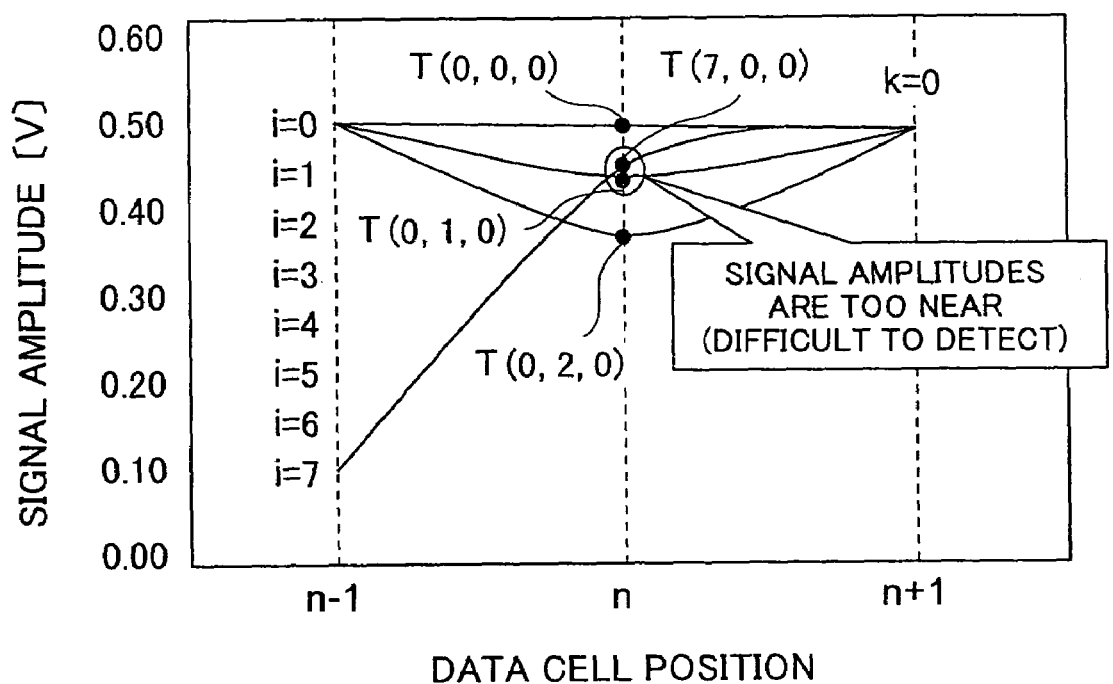
FIG. 3 is a diagram for explaining the characteristics of a read-out signal of eight-level data which is recorded to the optical disk at the recording density of 6.4 bits per μm.

FIG. 3 shows the characteristics of a read-out signal of eight-level data which is recorded to the optical disk at the recording density of 6.4 bits per μm.

In the characteristics of FIG. 3, the read-out signal amplitude is expressed in the vertical axis, and the position of the data cell is expressed in the horizontal axis.

The recording/reproducing conditions are that the length of the data cell in the circumferential direction of the disk is 0.47 micrometers, the wavelength of the laser beam is 650 nm, the numeric aperture is 0.65 NA, and the DVD+RW disk is used as the recording medium.

Suppose that the multi-level signal of the three continuous data cells (n−1, n, n+1) is set to T (i, j, k). As shown, in the determination (which is also called as the threshold determination) in which the fixed thresholds of 8 levels are equivalent to each level of the multi-level data, the multi-level signals T (0, 1, 0) and T (7, 0, 0) are too near under the influences of the intersymbol interference, and the distinction of T (0, 1, 0) and T (7, 0, 0) is difficult.

If the multiple level i (=7) of the (n−1)-th data cell and the multiple level k (=0) of the (n+1)-th data cell (0), which data cells are located before and after the n-th data cell of concern (the candidate for the reproduction), can be predicted, then the multi-level signals T (0, 1, 0) and T (7, 0, 0) are distinguishable.

For this purpose, if the j-th level in the case of T (7, 0, 0) is detected in advance, the two signals are distinguishable.

The determination method of the multi-level data described above is called the DDPR (data detection using pattern recognition).

In the DDPR, the pattern per the three continuous data cells is predicted, and the method of selecting the candidate of j which becomes the candidate for the reproduction is used.

Figures 4A, 4B:
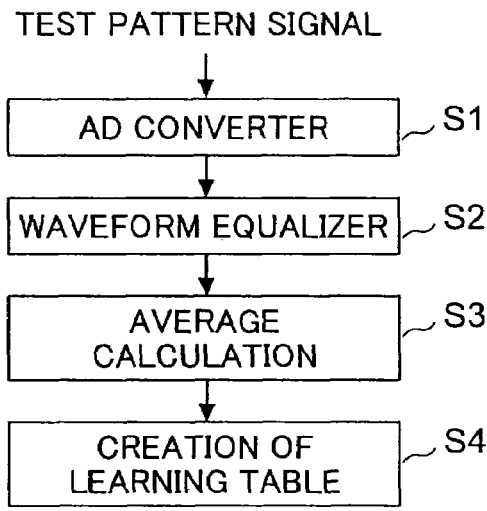
FIG. 4A and FIG. 4B are diagrams for explaining the algorithm of learning table creation according to the invention.

FIG. 4A is a flowchart for explaining the algorithm of the learning table creation according to the present invention.

In the flowchart of FIG. 4A, the multi-level signal distribution of the combination pattern of the three continuous data cells (in the case of the eight level recording, $8^3$=512 kinds), including the known combinations, is learned, and the pattern table is created.

As shown in FIG. 4A, the test pattern signal is first transformed into the digital signal by the AD converter (S1). The digital signal is sent to the waveform equalizer (S2). The average of the digital signals for "n" input data is calculated (S3). The above process is repeated for all the test patterns, and the results are stored in the learning table (S4).

FIG. 4B shows an example of the learning table. The combination of the test patterns stored includes 512 test patterns as shown in FIG. 4B. The averages of the output signal levels corresponding to (i, j, k) are stored as the signals T (i, j, k) respectively. For example, in the case of the signal T (0, 6, 0), the eight levels 0-7 are set up, the level of the "i" cell is 0, the level of the "j" cell is 6, and the level of the "k" cell is 0. Specifically, in the characteristics of FIG. 3, the level "0" is set to 0.5V and the level "6" is set to 0.15V.

Figure 5:
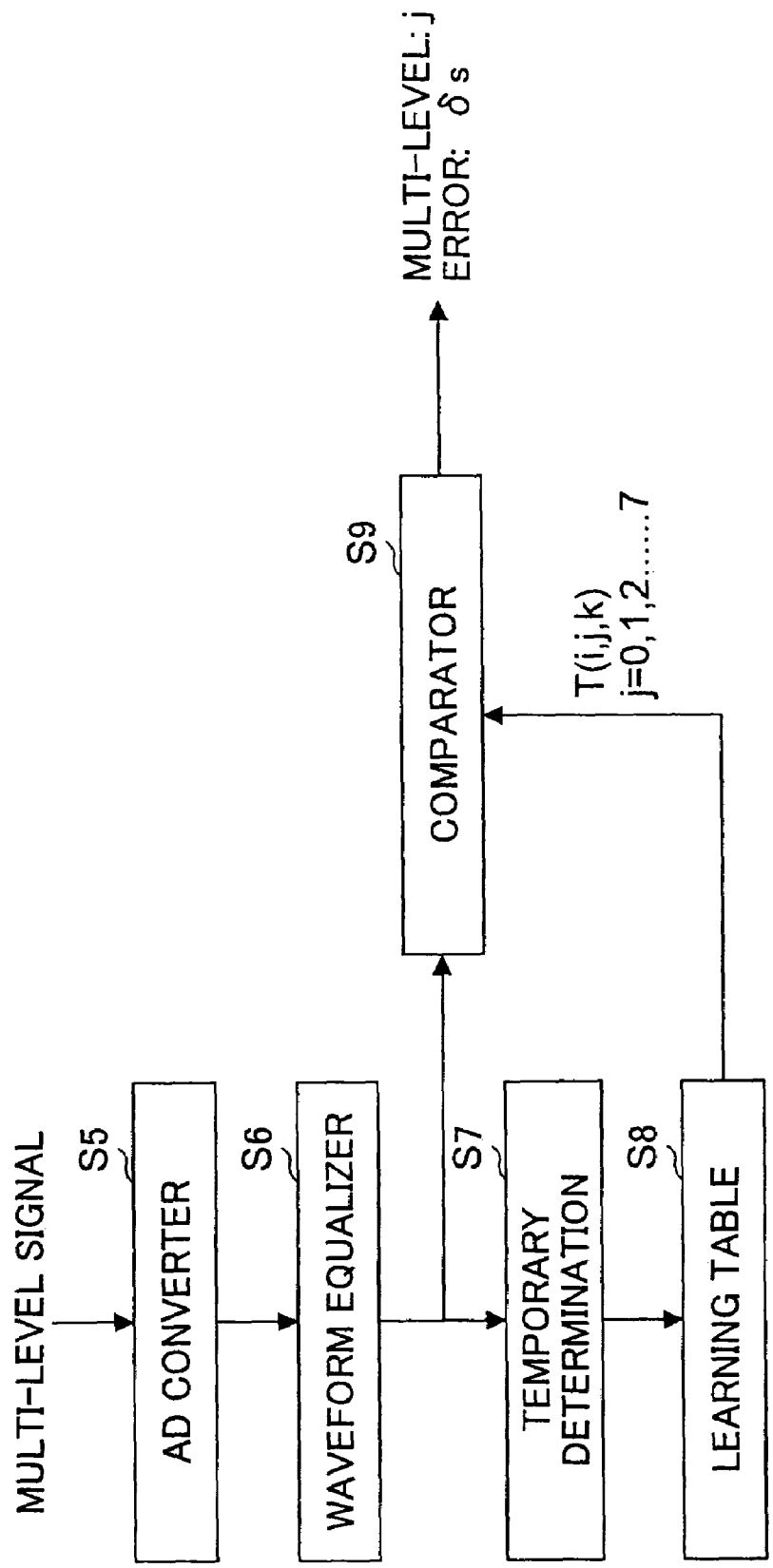
FIG. 5 is a diagram for explaining the algorithm of multi-level data candidate selection according to the invention.

FIG. 5 shows the algorithm of the multi-level candidate selection according to the present invention.

The multi-level candidate selection of FIG. 5 includes the step of the temporary determination of the multi-level data which is carried out from the read-out signal of the unknown multi-level data (the reproduction result), and the step of computation of an error δ s between the reproduced signals of the multi-level candidate data and the learning table data using the above-mentioned learning table as the result of the comparison.

The temporary determination is carried out in order to transform the actual multi-level signal into the digital signal by the AD converter (S5). The digital signal is supplied to the waveform equalizer (S6). The comparison of the multi-level candidate data j with the learning table is performed continuously (S7).

The pattern is chosen from the learning table based on the pattern recognition of the temporary determination (S8). The chosen pattern is compared with the output signal of the waveform equalizer by the comparator (S9). The error δ s between the reproduced signals of the multi-level candidate data j and the learning table data at that time is computed.

It is confirmed that the DDPR has the advantage that the error rate of the multi-level data candidate becomes 1/10 of the threshold determination or less by learning the tendency of the intersymbol interference in advance.

Figure 6:
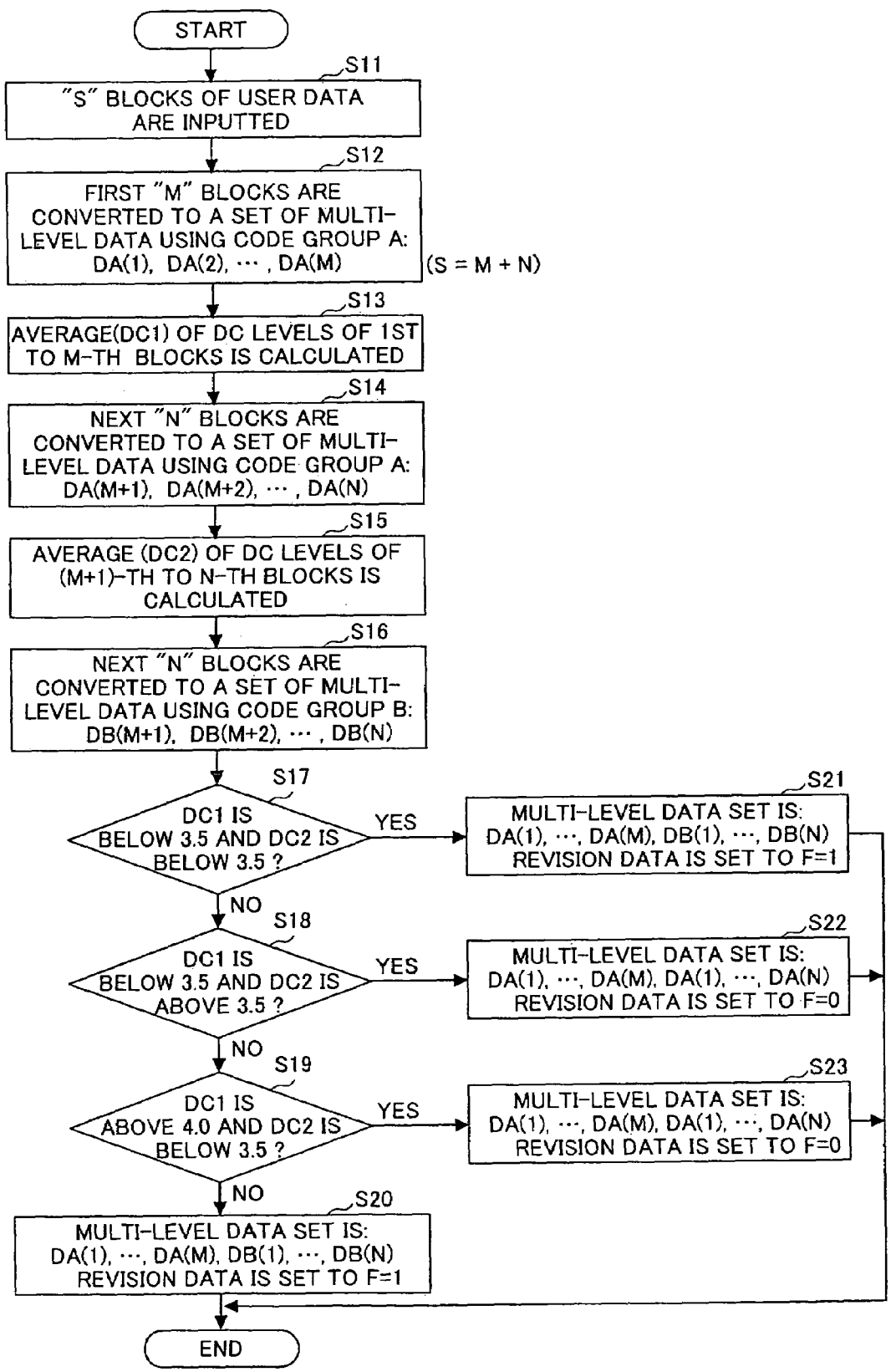
FIG. 6 is a flowchart for explaining the multi-level data generating process in one preferred embodiment of the invention.

FIG. 6 is a flowchart for explaining the multi-level data generating process in one preferred embodiment of the invention.

First, when "S" user data blocks in the sequence of user data blocks are transformed into the multi-level data blocks, two code groups A and B corresponding to one user data block and for different sets of the multi-level data blocks are prepared.

The "S" user data blocks are first inputted (S11); The multi-level data blocks DA(1), DA(2), . . . , DA(M) are generated from the user data blocks by using the code group A which is selected for the first M multi-level data blocks (S12). The average of DC levels of the M blocks is computed (S13).

For example, the calculation of the DC level average in the step S13 is performed by computing the DC level average by the formula: DC=(ML1+ML2+ML3+ML4)/4 when one multi-level data block includes four multi-level data (ML1, ML2, ML3, ML4) of 4 symbols.

In the case of the eight-level recording, each of ML1, ML2, ML3, and ML4 indicates the value in the range of 0, 1, 2, 3, 4, 5, 6, and 7. Consequently, the target value of DC level is set to the value "3.5" which is the central value of 0-7.

In the step S13, the average DC1 of the DC levels of the M multi-level data blocks is calculated.

Following the M multi-level data blocks, the next N multi-level data blocks are generated from the remaining user data blocks by using the code group A (S14). Similarly, the average DC2 of the DC levels of the N multi-level data blocks is calculated (S15).

After the step S15 is performed, the next N multi-level data blocks are generated from the remaining user data blocks by using the code group B (S16). The deviations of the DC1 and the DC2 from the target value "3.5" are compared. It is determined whether the deviations of the DC1 and the DC2 from the target value "3.5" are in the same direction (S17). When the result of the step S17 is affirmative, the revision data F is set to 1 and it is added to the multi-level data stream (S21). That is, the N multi-level data blocks generated by using the code group B are selected as the transformation data.

It is determined whether the DC1 is below the target value "3.5" and the DC2 is above the target value "3.5" (S18). When the result of the step S18 is affirmative (when the deviations of the DC1 and the DC2 from "3.5" are in the opposite directions, the revision data F is set to 0 and it is added to the multi-level data stream (S22).

Similarly, it is determined whether the DC1 is above the value "4.0" and the DC2 is below the target value "3.5" (S19). When the result of the step S19 is affirmative, the revision data F is set to 0 and it is added to the multi-level data stream (S23).

Otherwise the revision data F is set to 1 and it is added to the multi-level data stream (S20).

A description of the code group B will be given later. The average of the DC levels is in the position corresponding to the direction (plus or minus) to the code group A and the DC level target value "3.5", one of the two code groups A and B is selected, and it is possible to correct the DC level nearest to the target DC level value. In the above process of FIG. 6, the condition of the block count S=M+N is met.

Moreover, the revision of the change of the code group is described by the numeric value of the revision data F. The code group A is chosen in the transformation of the user data blocks into the N multi-level data blocks, which is indicated by the revision data F that is set to 0. On the other hand, the code group B is chosen, which is indicated by the revision data F that is set to 1.

Therefore, it is possible to correct the error of the recovery by recording the F together with the resulting information of the multi-level data format conversion.

Figure 11:
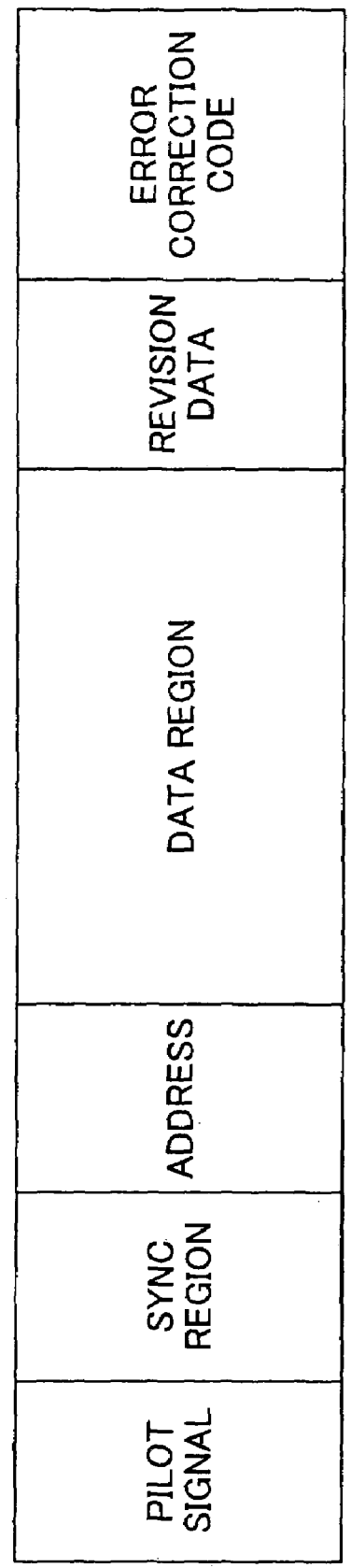
FIG. 11 is a diagram for explaining the data arrangement of one sector of an optical disk.

In addition, FIG. 11 shows the data arrangement of one sector of the optical disk which is recorded according to the present invention.

FIG. 7 shows an example of the code group parameters for the DC level suppressing control for a user data block.

Corresponding to one user data block, the two code groups A and B for different sets of the multi-level data blocks are prepared as shown in FIG. 7.

In the example of FIG. 7, the code data of the multi-level data block for one block contains the four symbols. In the eight-level recording (per one symbol), 2048 (=8×8×8×4) pieces of the codes exist in the table of the one data block.

In the method wherein the two code groups corresponding to one user data block and for different sets of the multi-level data blocks are prepared, it has the DC level from which the average of DC level of the multi-level data block to which two code groups correspond mutually serves as the outline object in the direction of plus or minus to target DC level 3.5. That is, the average DC level of the code group A of the user data 0 is set to "−2.5" to "DC level which is 1.0" and serves as target "3.5".

The average DC level of the code group B corresponding to it is set to "+2.8" to "DC level which is 6.3" and serves as target "3.5".

Moreover, it is characteristic in total of each multi-level data code of the data stream to which two code groups correspond mutually being the relation from which it becomes the even number with the odd number for another side.

Since the average of the DC level of the multi-level data block which corresponds mutually serves as the outline object in the direction of plus or minus to the DC level "3.5" used as the target as mentioned above, there is capacity which corrects DC level by switching the code group.

Furthermore, when the total of each multi-level data code of the data streams of the two code groups which corresponds mutually recovers from one being the relation from which another side serves as the even number with the odd number, it becomes possible whether the number of the value of F determined from revision data and total of each multi-level data code is odd or the number is even, and to check whether the candidate selected with the DDPR by comparing is right.

Figure 8:
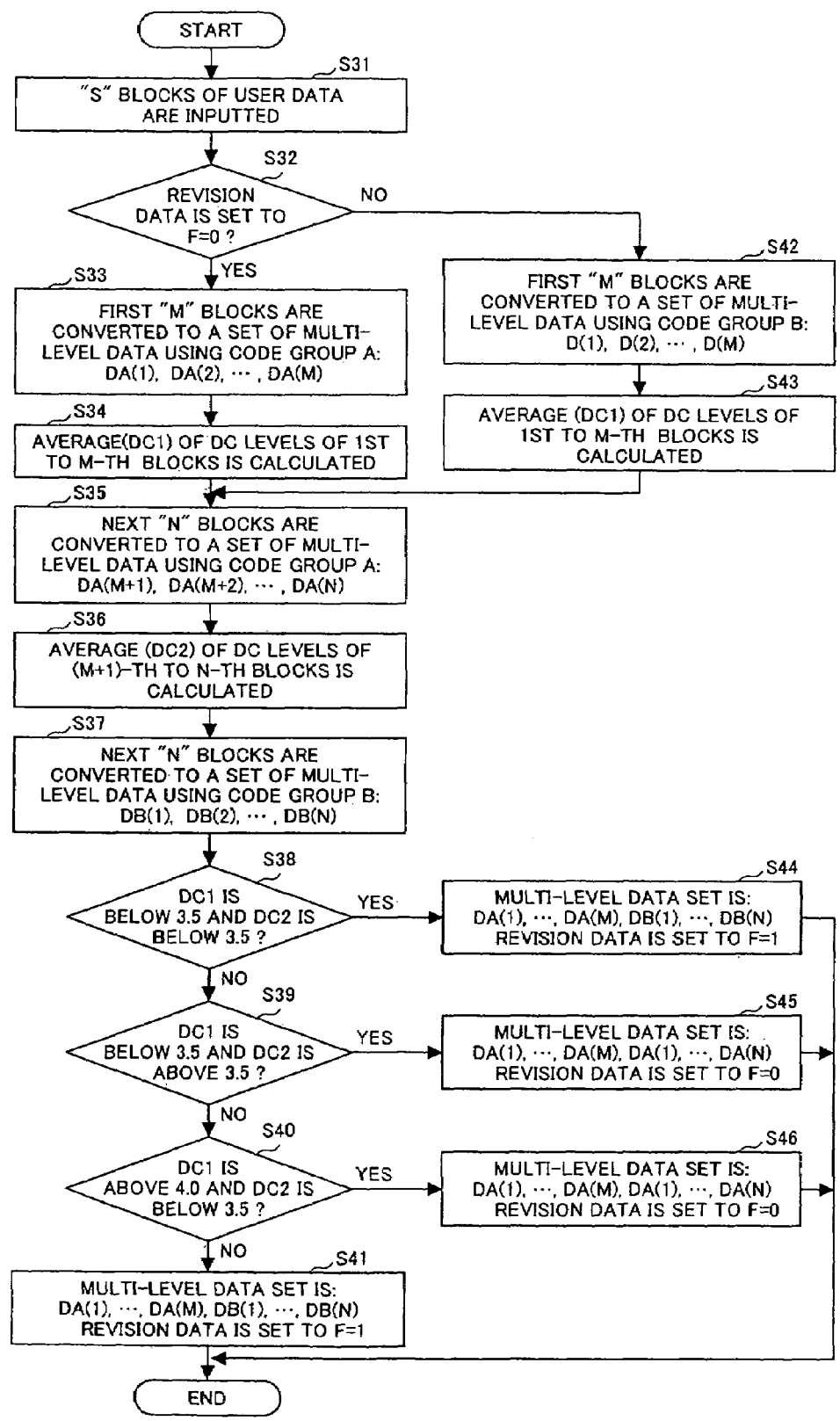
FIG. 8 is a flowchart for explaining the multi-level data generating process in another preferred embodiment of the invention.

FIG. 8 is a flowchart for explaining the multi-level data generating process in another preferred embodiment of the present invention.

First, when "S" user data blocks in the sequence of user data blocks are transformed into the multi-level data blocks, two code groups A and B corresponding to one user data block and for different sets of the multi-level data blocks are prepared.

The "S" user data blocks are first inputted (S31). It is determined whether the revision data F is set to 0 (S32).

When F=0, the multi-level data format conversion is carried out by using the code group A which is selected for the first M multi-level data blocks (S33). The average (DC1) of the DC levels of the M blocks is computed (S34).

For example, the calculation of the DC level average in the step S13 is performed by computing the DC level average by the formula: $DC=(ML1+ML2+ML3+ML4)/4$ when one multi-level data block includes four multi-level data (ML1, ML2, ML3, ML4) of 4 symbols.

In the case of the eight-level recording, each of ML1, ML2, ML3, and ML4 indicates the value in the range of 0, 1, 2, 3, 4, 5, 6, and 7. Consequently, the target value of DC level is set to the value "3.5" which is the central value of 0-7.

In the step S34, the average DC1 of the DC levels of the M multi-level data blocks is calculated.

When the result of the step S32 is negative (or when F=1), the multi-level data format conversion is carried out by using the code group B which is selected for the first M multi-level data blocks (S42). Similarly, the average DC1 of DC levels of the M blocks is computed (S43). The control is transferred to the next step S35.

The next N multi-level data blocks, following the M multi-level data blocks, are generated by using the code group A (S35). The average DC2 of DC levels of the N blocks is computed (S36).

After the step S36 is performed, the N multi-level data blocks are generated by using the code group B (S37). The deviations of the DC1 and the DC2 from the target value "3.5" are computed.

It is determined whether the deviations of the DC1 and the DC2 from the target value "3.5" are in the same direction (S38). When the result of the step S38 is affirmative, the revision data F is set to 1 and it is added to the multi-level data stream (S44). That is, the N multi-level data blocks generated by using the code group B are selected as the transformation data.

It is determined whether the DC1 is below the target value "3.5" and the DC2 is above the target value "3.5" (S39). When the result of the step S39 is affirmative (when the deviations of the DC1 and the DC2 from "3.5" are in the opposite directions), the revision data F is set to 0 and it is added to the multi-level data stream (S45).

Similarly, it is determined whether the DC1 is above the value "4.0" and the DC2 is below the target value "3.5" (S40). When the result of the step S40 is affirmative, the revision data F is set to 0 and it is added to the multi-level data stream (S46).

Otherwise the revision data F is set to 1 and it is added to the multi-level data stream (S41).

In addition to the flowchart shown in FIG. 6, it is associated with the value of the revision data F and the multi-level data block conversion is performed for the following S user data blocks.

When F=0, it is fixed to the code group A, and the code group which is chosen for the M multi-level data blocks with the value of F is fixed to the code group B when F=1.

Therefore, it is possible to check whether the candidate selected with the DDPR is correct by the determination of the multi-level data code of the M heads to be the value of the revision data F determined.

Moreover, even if it does not record the revision data F together with the multi-level data block, it is possible to check whether the candidate selected with the DDPR is correct by comparing the code group to which the next N multi-level data blocks belong with the code group to the which M multi-level data blocks to which it belongs.

In this case, it is not necessary to record the value of the revision data F, and there is the merit which the coding efficiency can be raised.

Figure 9:
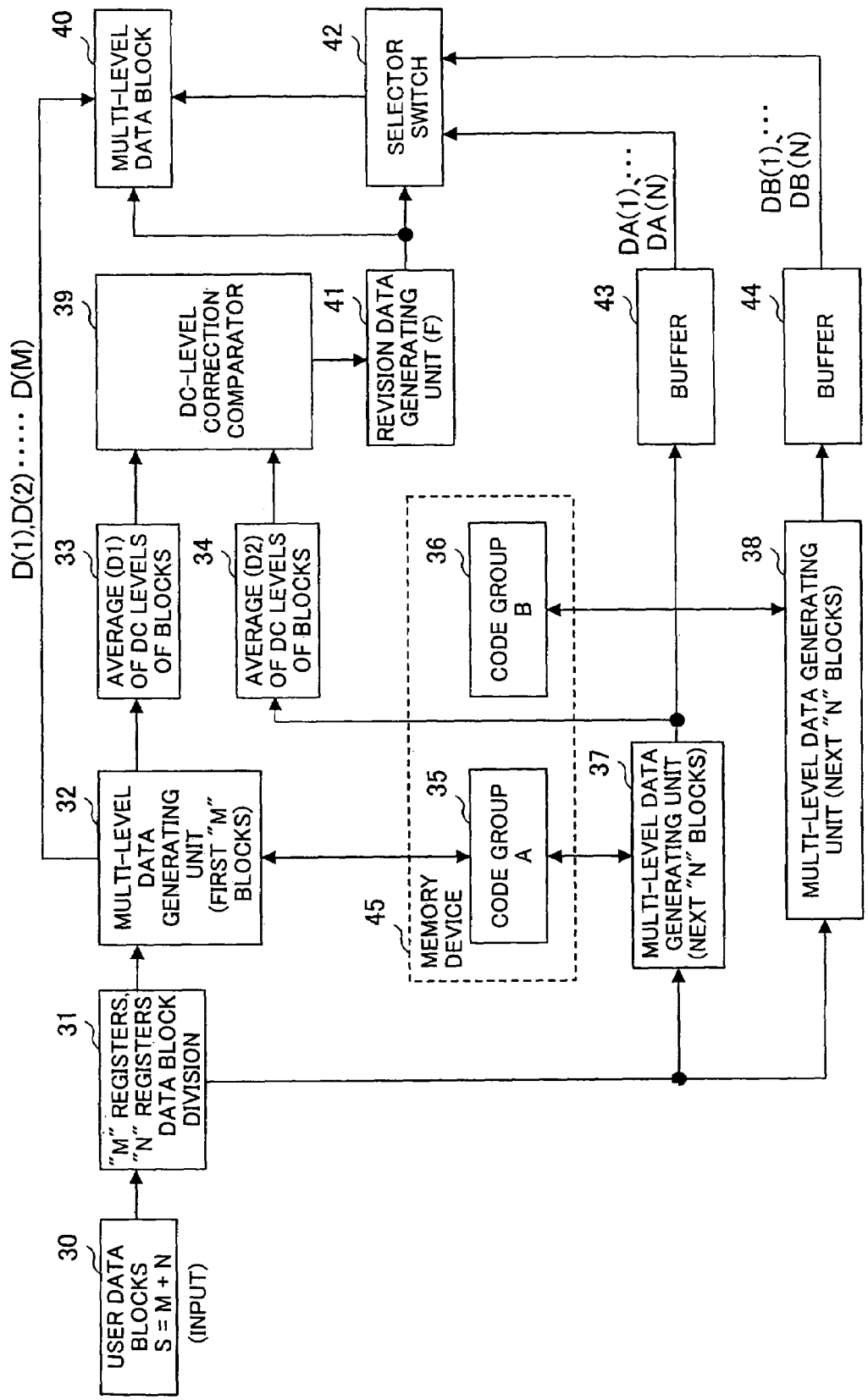
FIG. 9 is a block diagram of the multi-level data recording device in one preferred embodiment of the invention.

FIG. 9 shows one preferred embodiment of the multi-level data recording device of the invention which uses the multi-level data generating process according to the invention.

As shown in FIG. 9, the multi-level data recording device of the present embodiment includes data block division registers 31, a multi-level data generating unit 32, multi-level data generating units 37 and 38, a memory device 45, DC-level average calculation unit 33 and 34, a DC-level correction comparator 39, a revision data generating unit 41, a selector switch 42, and buffers 43 and 44.

The memory device 45 includes a code-group-A memory 35 and a code-group-B memory 36. The multi-level data recording device receives the sequence of user data blocks 30 as the input from an external input device (not shown), and transmits the sequence of multi-level data blocks 40 as the output to an external output device (not shown).

The "S" registers 31 are provided to divide the input user data blocks 30 into first data blocks (retained in the "M" registers) and second data blocks (retained in the "N" registers), where S=M+N.

Each of the multi-level data generating units 32, 37 and 38 is provided to generate the multi-level data block from each user data block divided by the registers 31.

The memory device 45 stores the data of two code groups A and B corresponding to one user data block: the memory 35 storing the data of the code group A, and the memory 36 storing the data of the code group B.

Each of the averaging units 33 and 34 is provided to calculate the average of DC levels based on the multi-level data generated by the multi-level data generating units 32 and 37.

The DC-level correction comparator 39 is provided to compare the DC level average computed by each of the averaging units 33 and 34 with a given reference level. The revision data generating unit 41 is provided to generate a revision data (F) by using a result of the comparison by the DC-level correction comparator 39. The revision data generating unit 41 outputs the revision data F to each of the selector switch (SW) 42 and the multi-level data block memory 40 as the additional output data.

In accordance with the value of the revision data F from the revision data generating unit 41, the selector switch 42 selects one of the "N" multi-level data blocks, which are generated by the multi-level data generating units 37 using the data of the code group A stored in the memory 35, and the "N" multi-level data blocks, which are generated by the multi-level data generating unit 38 using the code group B stored in the memory 36. The selector switch 42 outputs the selected data blocks to the multi-level data block memory 40 as the output data.

By the multi-level data block generating unit 32, the first "M" user data blocks are transformed into the multi-level data blocks by using the code group A of the code group table shown in FIG. 7.

On the other hand, by using the two multi-level data block generating units 37 and 38, the second "N" user data blocks are transformed into the two kinds of the multi-level data blocks by using the code groups A and B, respectively.

Moreover, the averaging unit 33 calculates the average D1 of the DC levels based on the multi-level data blocks which are generated from the first "M" user data blocks by using the data of the code group A. Simultaneously, the averaging unit 34 calculates the average D2 of DC levels based on only the multi-level data blocks which are generated from the second "N" user data blocks by using the date of the code group A.

The CD-level correction comparator 39 uses the revision data generating unit 41 and determines whether the relation between the DC-level average D1 and the DC-level average D2 is in agreement with any of the conditions as in the flowchart of FIG. 6. As a result of such determination, the revision data generating unit 41 determines the value of the revision data F.

In accordance with the value of the revision data F, the input "S" user data blocks are transformed into the continuous multi-level data blocks as the output data. Namely, when F=0, the multi-level data blocks include D (1), D (2), . . . D (M) and DA (1), DA (2), . . . DA (N), and when F=1, the multi-level data blocks include D (1), D (2), . . . D (M) and DB (1), DB (2), . . . , DB (N). The resulting multi-level data blocks are stored into the multi-level data block memory 40 together the revision data F.

Figure 10:
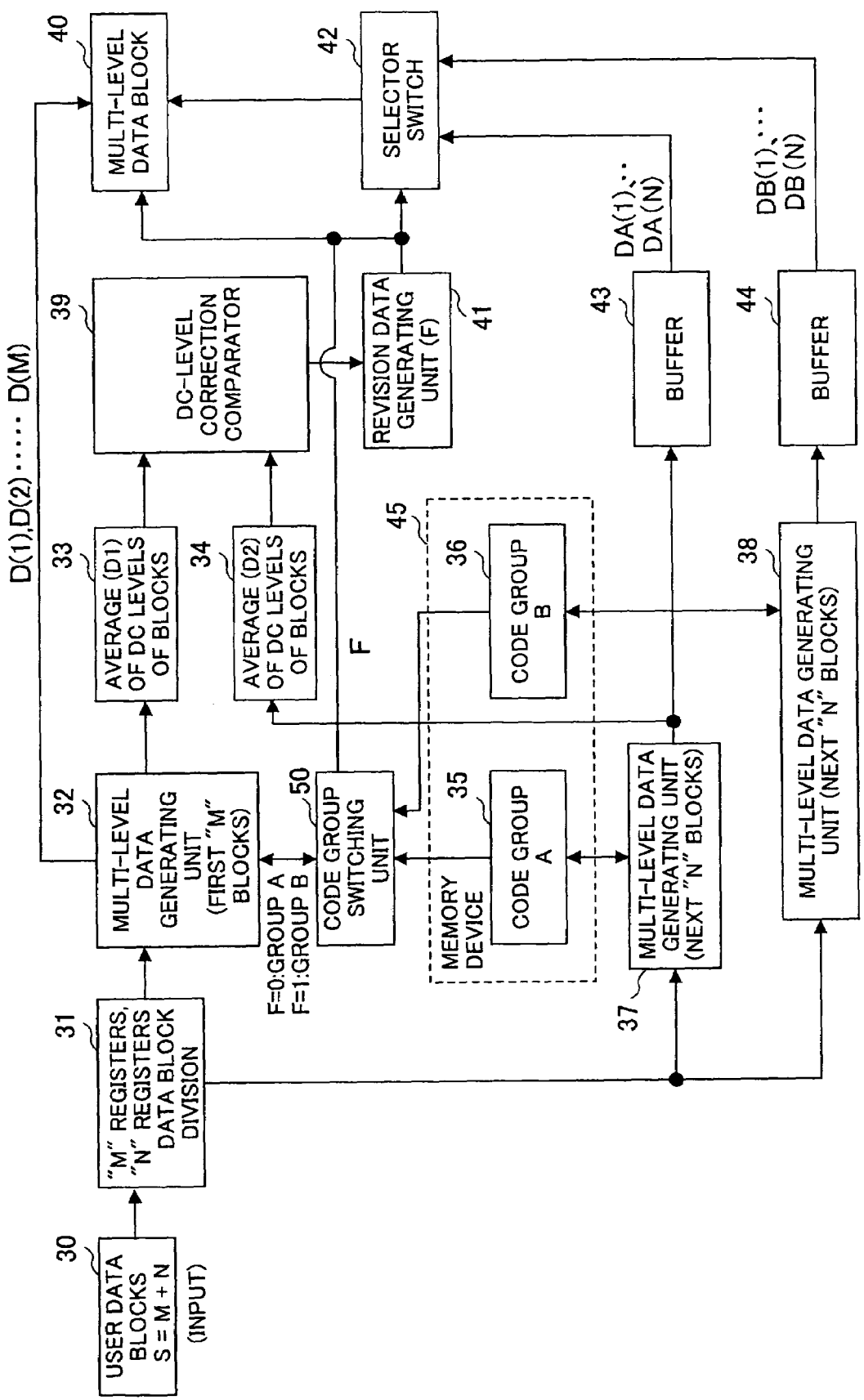
FIG. 10 is a block diagram of the multi-level data recording device in another preferred embodiment of the invention.

FIG. 10 shows another preferred embodiment of the multi-level data recording device of the invention which uses the multi-level data generating process of the invention.

In FIG. 10, the elements which are essentially the same as the corresponding elements in FIG. 9 are designated by the same reference numerals, and a description thereof will be omitted.

In the embodiment of FIG. 10, what is different from the embodiment of FIG. 9 is that a code group selector unit 50 is additionally provided.

Based on the value of the revision data F, the code group selector unit 50 determines which one of the data of the code group A or the data of the code group B is used to transform the first "M" user data blocks of the following "S" user data blocks into the multi-level data blocks.

In this case, the value of the revision data F can be presumed from the demodulated data of the "M" multi-level data blocks, and it is not necessary to record the revision data F in addition to the "M" multi-level data blocks.

However, when the fluctuation (noise) of the signal by disturbance is large, or when the optical disk with many defects is used, the recording of the revision data F in addition to the "M" multi-level data blocks is suitable because it is possible to lower the error probability of the recovery with the use of the revision data F.

Figure 12:
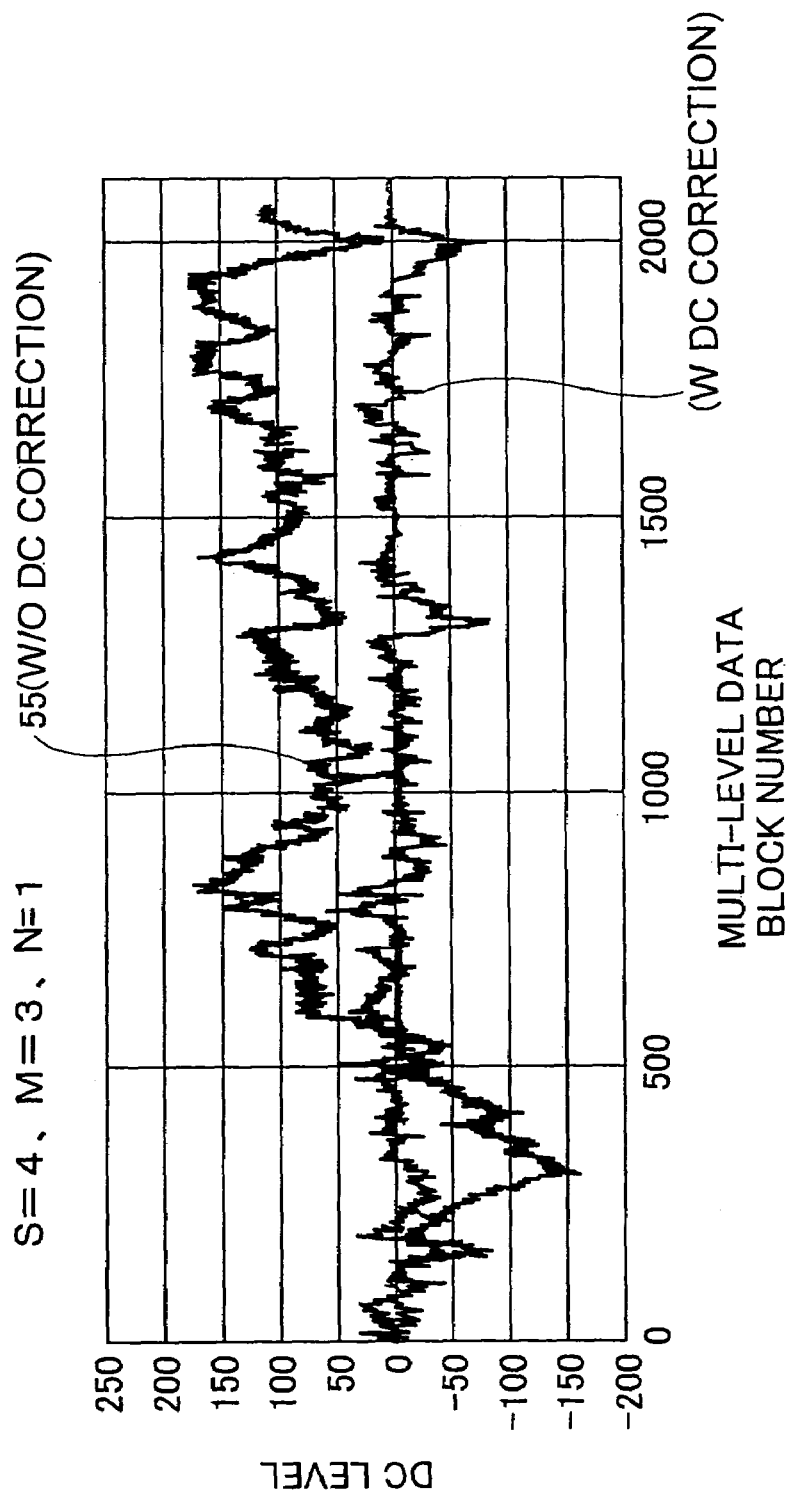
FIG. 12 is a diagram for explaining the relationship between the multi-level data block number and the DC level when the DC level correction is performed.

FIG. 12 is a diagram for explaining the relationship between the multi-level data block number and the DC level when the DC level correction is performed.

The relationship of FIG. 12 is the result of the relation of the data block number (S=M+N) and the DC level when performing the DC level correction in the case of S=4 (blocks), M=3 (blocks) and N=1 (block). The horizontal axis indicates the multi-level data-block number in the case of reproducing the data continuously, and the vertical axis indicates the accumulation value of DC level variation. The data curve "55" indicates the data of the relationship without the DC level correction, and the data curve "56" indicates the data of the relationship with the DC level correction.

As shown in FIG. 12, by the accumulation calculations, the accumulation differences are shown with the target value of the DC level set to "3.5" corresponding to the difference 0. From the results of the relationship of FIG. 12, it shown that the accumulation of DC level variation can be removed with sufficient precision. In addition, the random pattern of "m" sequence is used for the user data curve 55 before performing the DC level correction.

Figure 13:
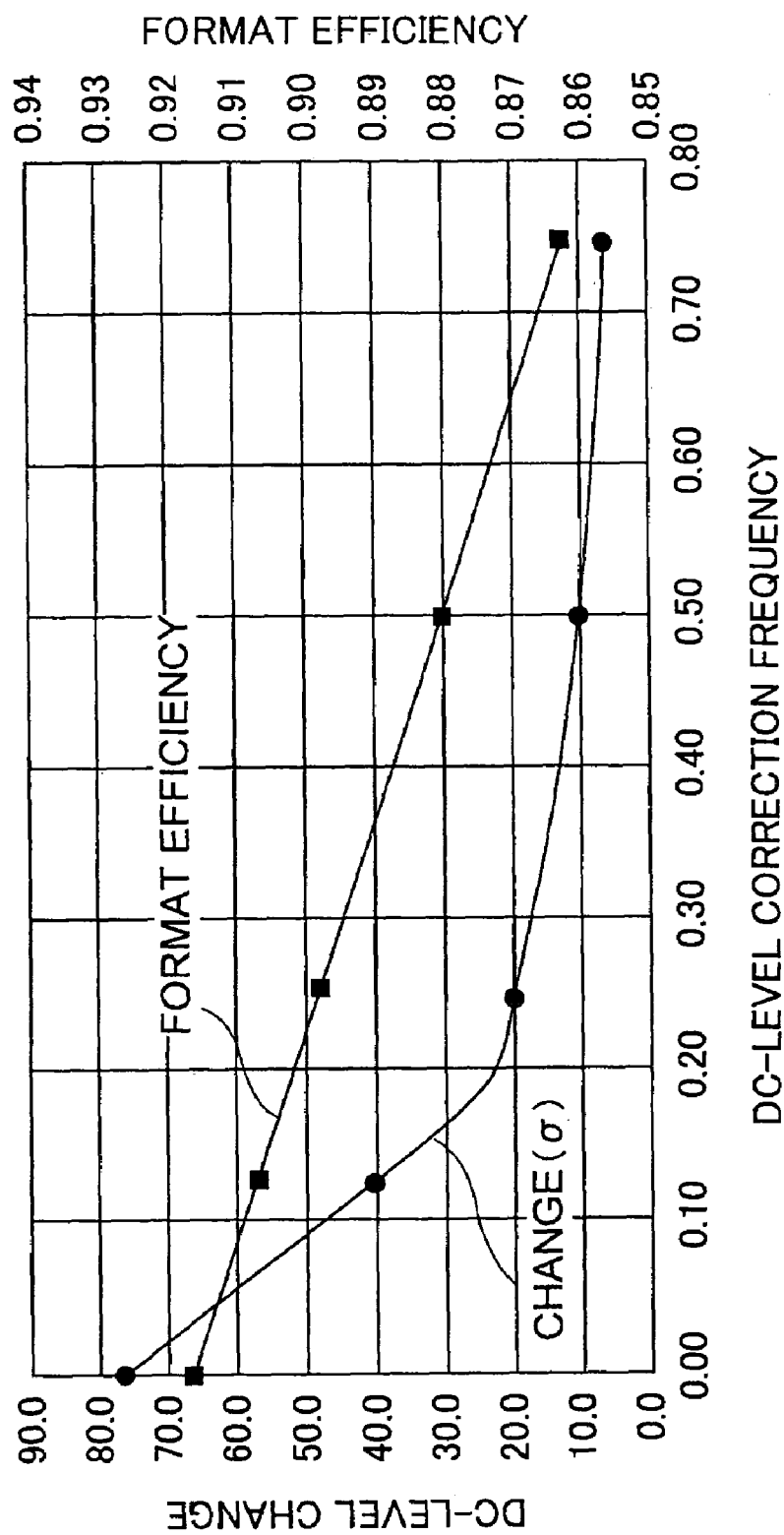
FIG. 13 is a diagram for explaining the relationship between the DC level correction frequency and the DC level change.

FIG. 13 is a diagram for explaining the relationship between the DC level correction frequency and the DC level change.

As shown in FIG. 13, the combination of the numeric values of S, M, and N are changed, and the removal capacity of DC level variation is investigated. As for the removal capacity, 100% shows the DC level variation 0 (which is the ideal value and the deviation from the DC level target value is 0). Moreover, the coding efficiency is the calculation value in the case of recording the revision data together, and it indicates the rate of the revision data to the user data. The DC level correction frequency in the horizontal axis indicates the ratio of N to S.

The experiment has been conducted using the data recording/reproducing device of DVD+RW type and the optical disk.

The combination of the DC level correction frequency is as in the following TABLE 1. From this result, in the combination of correction frequency 0.25 (S=4, N=1), 80% or more of DC level correction effect is acquired, and, moreover, the decline in the coding efficiency is able to check 2%. Hence, it is confirmed that according to the present invention it is possible to realize the DC level correction in a very efficient manner.

TABLE 1

| Combination of Parameters | Correction Frequency |
| --- | --- |
| S = 4, N = 3 | 0.75 |
| S = 2, N = 1 | 0.50 |
| S = 4, N = 1 | 0.25 |
| S = 8, N = 1 | 0.13 |

Figure 14:
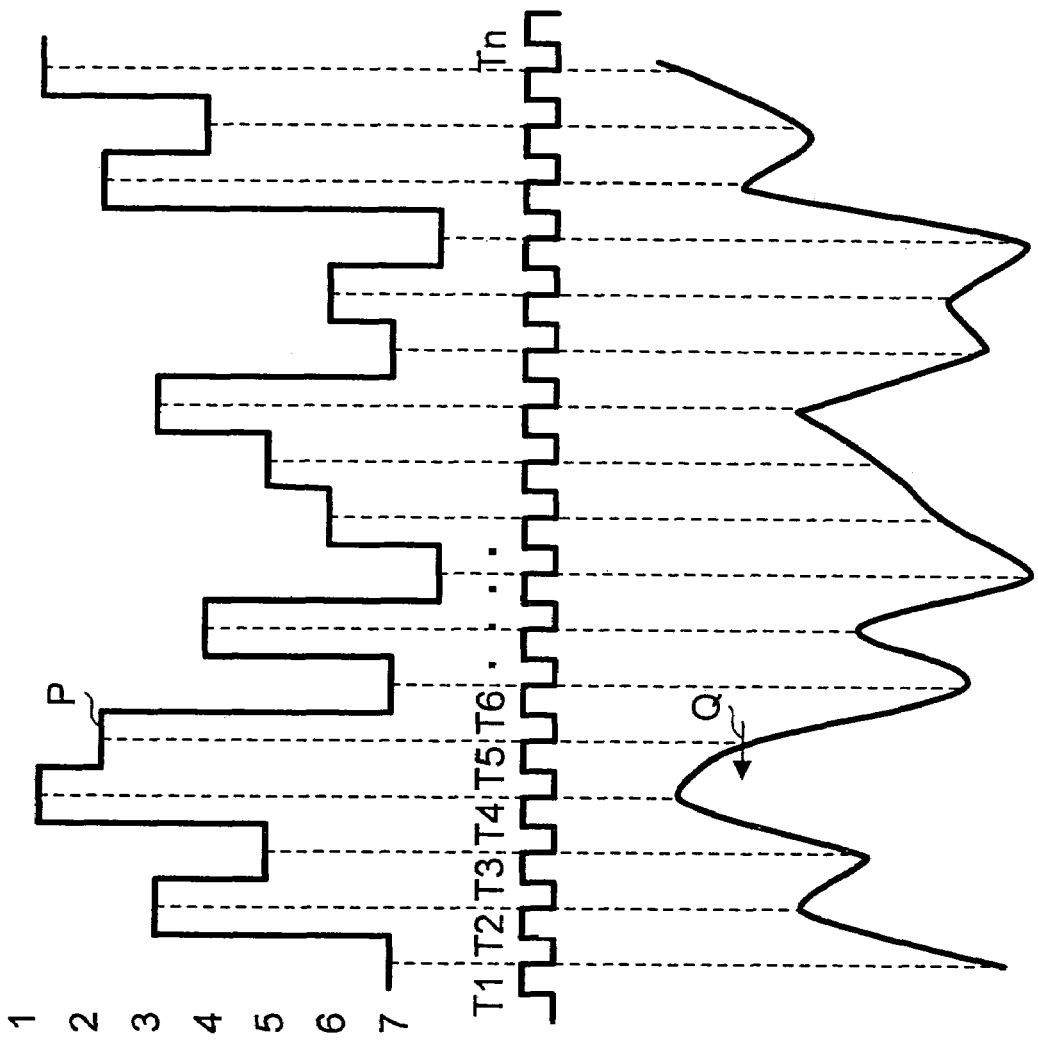
FIG. 14A, FIG. 14B and FIG. 14C are diagrams for explaining the waveform of a read-out signal of multi-level data

Next, FIG. 14A through FIG. 14C are diagrams for explaining the waveform of a read-out signal (reproduction signal) of the multi-level data. FIG. 14A indicates the ideal value of the read-out signal waveform, FIG. 14B indicates the ideal reproduction clock signal, and FIG. 14C indicates the actual read-out signal waveform.

Suppose that the reproduction signal waveform is generated by sampling at the falling edge of the reproduction clock. For example, the level 1 is ideally detected at the P point with the falling edge of the clock signal T5 as in FIG. 14A.

However, in the case of the actual reproduction signal waveform of FIG. 14C, when detecting the level at the Q point with the falling edge of the clock signal T5, the actual reproduction signal waveform may be shifted in the direction of the arrow sharply, and it is difficult that the level at the Q point is detected correctly with the clock signal T5.

Figure 15:
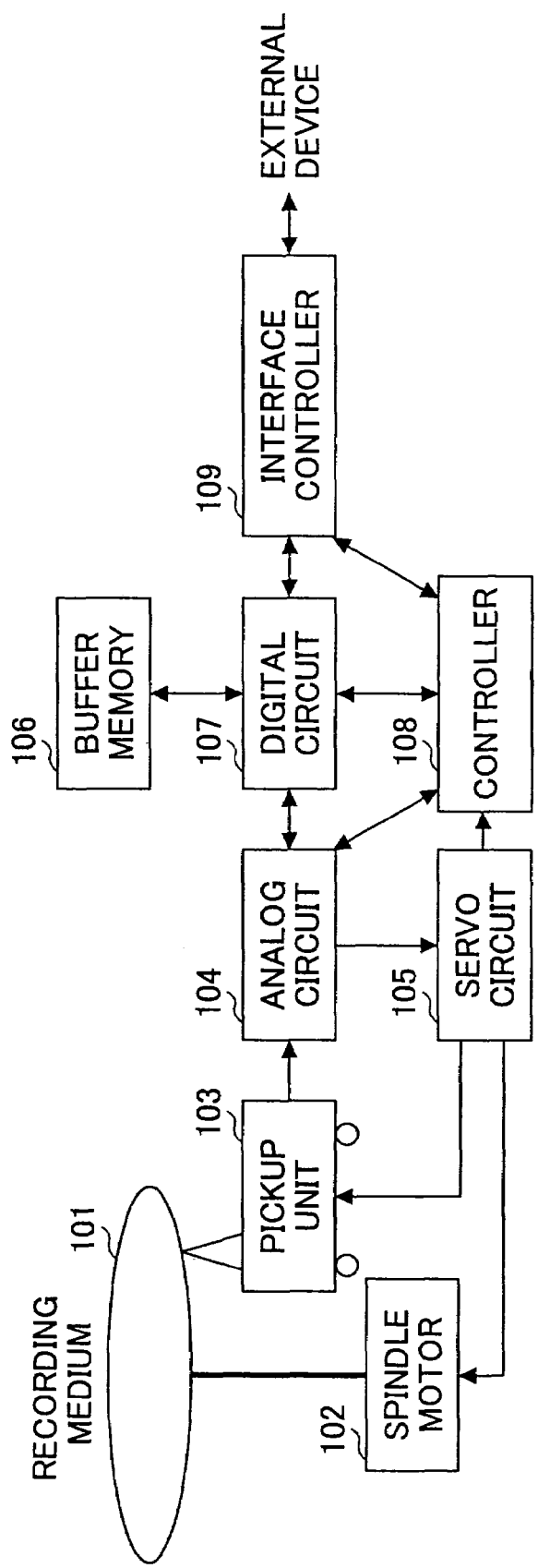
FIG. 15 is a block diagram of an optical disk drive to which an embodiment of the data recording/reproducing device of the invention is applied.

FIG. 15 shows an optical disk drive to which an embodiment of the data recording/reproducing device of the present invention is applied.

In the following description, the optical disk is considered a typical example of a recording medium. However, the present invention is not limited to the optical disk recording/reproducing device, and it is also applicable to other recording/reproducing methods using the magneto-optical recording media, the write-once and read-many media, other rewritable media, etc. Moreover, the composition of FIG. 15 is the minimum composition required for the description.

The optical disk drive of FIG. 15 includes an optical disk 101, a spindle motor 102, a pickup unit 103, an analog circuit 104, a servo circuit 105, a buffer memory 106, a digital circuit 107, a controller 108, and an interface controller 109.

The optical disk 101 stores the multi-level data recorded by the optical disk drive, and the spindle motor 102 rotates the optical disk 101 at a predetermined rotation speed. The pickup unit 103 receives the reflected light beam from the optical disk 101 and generates the focusing error signal and the tracking-error signal.

The analog circuit 104 controls the drive current to cause the LD of the pickup unit 103 to emit the light beam. The servo circuit 105 controls the pickup unit 103. The buffer memory 106 stores the data to be sent to or received from the external device.

The digital circuit 107 performs the synchronous detection, the recovery, the error correction, etc. The interface controller 109 controls exchange of the command. The controller 108 controls the whole optical disk drive.

A description will be given of operation of the optical disk drive of FIG. 15.

If the command is sent to the optical disk drive from the external device (for example, a personal computer) which is not illustrated, the interface controller 109 receives the command and sends the received command to the controller 108.

The controller 108 interprets this command, performs the operation of the optical disk drive that is requested by the command, and sends the report of the operation to the external device through the interface controller 109.

Moreover, when the information is recorded, the date sent from the external device through the interface controller 109 is stored in the buffer memory 106 via the digital circuit 107.

The digital circuit 107 attaches the error correcting code to the data, adds the sync signal to the data, and it operates to transform the data into the modulation code to the multi-level level etc.

Moreover, the address to write in records the information on the address which read the address currently beforehand written on the medium and is directed.

Next, in the analog circuit 104, in order to record on the optical disk drive, the current which drives the LD of the pickup unit 103 to emit the light beam is controlled, and the multiple-level data is recorded.

Moreover, the reflected light beam from the optical disk 101 is received by the PD and processed by the analog circuit 104 in response to the reflected light. The analog circuit 104 generates the focusing error signal, the tracking-error signal, etc., and these signals are sent to the servo circuit 105.

The position of the pickup unit 103 and the position of the focusing lens are controlled by the servo circuit 105.

In this case, the optical disk 101 usually has the spiral groove or the data array.

Therefore, the light beam from the pickup unit 103 will be moved to the periphery with the passage of time from the inner (for example, in the direction from the inner track to the outer track) and the range which can carry out tracking control will be exceeded.

Then, the pickup unit 103 is moved from the tracking-servo signal, and control called truck the carry so that the position of the lens can always maintain in the form near neutrality is performed.

Next, when the reproduction is performed, the clock extraction is performed for the output of the pickup unit 103 using the quantization, PLL, etc. by the analog circuit 104, the synchronous detection, the recovery, the error correction, etc. are performed by the digital circuit 107, and the resulting data is stored in the buffer memory 106. Then, the information is transmitted to the external device through the interface controller 109.

Thus, the servo signal and the read-out signal generate the signal from the pickup unit 103, when the signal of the servo band is in the read-out signal, it turns to the servo signal as a noise, and they are crowded, and have a possibility that the servo may not start stably. Then, when the data is modulated, it is necessary to make it the signal of the servo band not come out.

Figure 16:
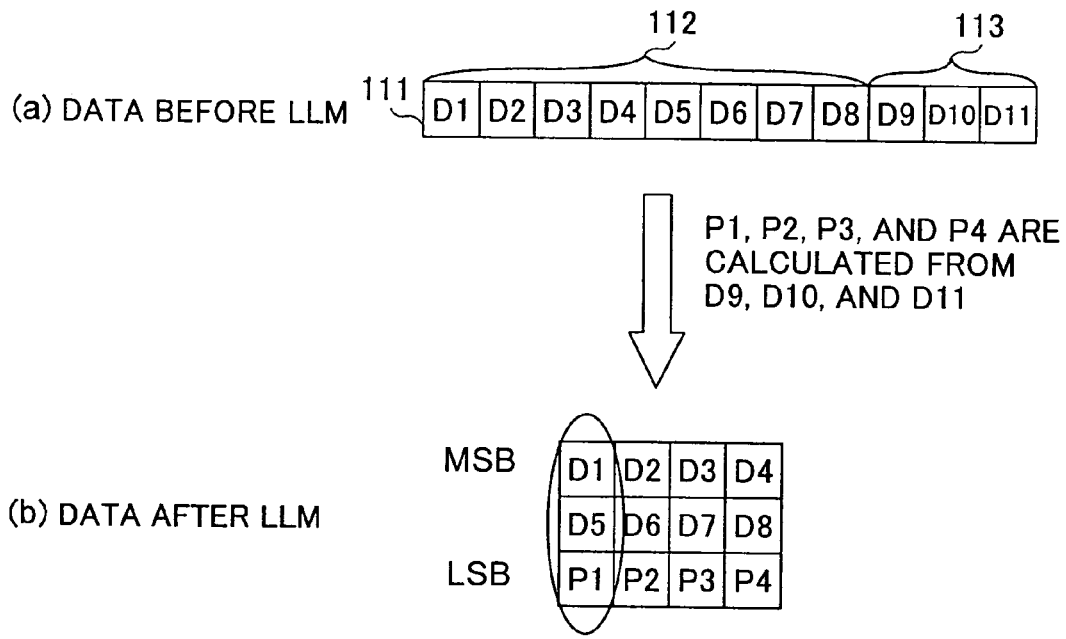
FIG. 16 is a diagram for explaining the LLM modulation method according to the invention.

FIG. 16 is a diagram for explaining the modulation technique (LLM) of the present invention.

An example of the data 111 before the LLM modulation indicated by (a) in FIG. 16 will be explained in the case where the 11-bit data (D1-D11) is modulated.

For example, the LLM modulation serves to calculate four sets of 3-bit multi-level data items, indicated by (b) in FIG. 16, from the 11-bit data 111. Specifically the LLM modulation sets up the four sets of 3-bit multi-level data items as follows. The high-order bit data items (D1-D8) 112 of the original multi-level data 111 before the LLM modulation are arranged to the first and second rows of the new multi-level data items without change, and each of the least significant bits (LSB) P1-P4 of the new multi-level data items are calculated from the data items (D9-D11) 113 of the original multi-level data 111.

Each value of the 3-bit multi-level data items after the LLM modulation is recorded to the recording medium respectively on the basis of the unit data (3 bits) encircled by the ellipse in FIG. 16(b).

Moreover, the reproduction of the recorded data from the recording medium is performed by computing the optimal value in accordance with the rule of calculation of each of the least significant bits (LSB) P1-P4 of the new multi-level data items.

Next, a description will be given of the method of detecting DC level when performing the DC level correction.

As shown in FIG. 14A through FIG. 14C, as for the 8-level data, the multi-level data has the level of 0 to 7. Then, the DC level detection is controlled so that the center level becomes the level of 3.5.

As shown in the following TABLE 2, the evaluation value DSV (Digital Sum Value) of each level is determined so that the control of the center level to 3.5 can be easily carried out.

TABLE 2

| Level | Evaluated DSV |
|---|---|
| 0 | 3.5 |
| 1 | 2.5 |
| 2 | 1.5 |
| 3 | 0.5 |
| 4 | −0.5 |
| 5 | −1.5 |
| 6 | −2.5 |
| 7 | −3.5 |

Figure 17:
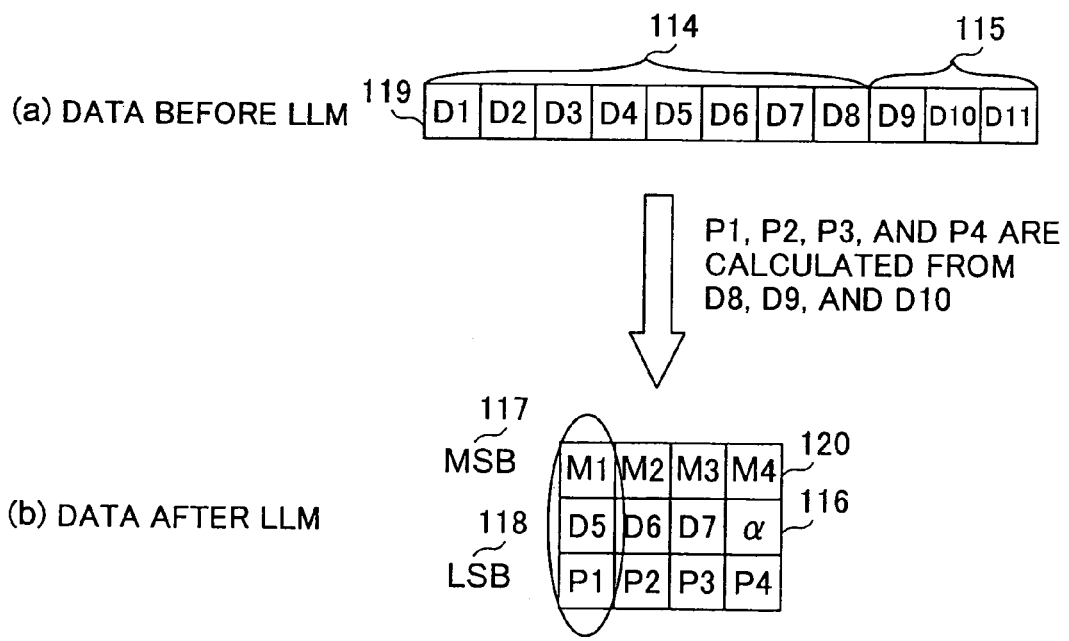
FIG. 17 is a diagram for explaining the LLM modulation method in one preferred embodiment of the invention.

FIG. 17 is a diagram for explaining the modulation technique (LLM) of the present invention.

An example of the data 119 before the LLM modulation indicated by (a) in FIG. 17 will be explained in the case where the 10-bit data (D1-D10) is modulated.

For example, the LLM modulation serves to calculate four sets of 3-bit multi-level data items 120, indicated by (b) in FIG. 17, from the 10-bit data 119. Specifically the LLM modulation sets up the four sets of 3-bit multi-level data items as follows. The high-order bit data items (D1-D7) 114 of the original multi-level data 119 before the LLM modulation are arranged to the first and second rows of the new multi-level data items without change, and each of the least significant bits (LSB) P1-P4 of the new multi-level data items are calculated from the data items (D8-D10) 115 of the original multi-level data 119.

And alpha ($\alpha$) 116 is used for the information which indicates whether the most significant bit is reversed. When alpha=1, all the most significant bits are reversed. Hence, the two kinds of patterns are generated for the case where alpha is 1 and the case where alpha is 0, each DSV is calculated, and the result added to the accumulation value of DSV adopts the data of the direction near 0.

If alpha is in the most significant bits at this time, the amount of correction will be reduced again since these bits cannot be reversed. Then, the position of alpha is placed in addition to the most significant bits. As usual, after reproduction the optimal value of alpha is calculated from the production rule of the multiple-value data to the 4 least significant bits (M1-M4), and the EXOR logic operations of alpha and M1-M4 as in the following TABLE 3 are performed, and the resulting bits D1-D4 are restored.

Moreover, the reproduction of the recorded data from the recording medium is performed by computing the optimal value in accordance with the rule of calculation of each of the least significant bits (LSB) P1-P4 of the new multi-level data items.

TABLE 3

| |
|---|
| D1 = M1 EXOR $\alpha$ |
| D2 = M2 EXOR $\alpha$ |
| D3 = M3 EXOR $\alpha$ |
| D4 = M4 EXOR $\alpha$ |

Furthermore, when the DSV is calculated, the reversed DSV is calculated as in the following TABLE 4, such that the value "+4" is added to the evaluated DSV when the corresponding bit of the MSB (M1-M4) is 1, and the value "−4" is added to the evaluated DSV when the corresponding bit of the MSB is 0.

TABLE 4

| Level | Evaluated DSV | Reversed Level | Reversed DSV |
|---|---|---|---|
| 0 | 3.5 | 4 | −0.5 |
| 1 | 2.5 | 5 | −1.5 |
| 2 | 1.5 | 6 | −2.5 |
| 3 | 0.5 | 7 | −3.5 |
| 4 | −0.5 | 0 | 3.5 |
| 5 | −1.5 | 1 | 2.5 |
| 6 | −2.5 | 2 | 1.5 |
| 7 | −3.5 | 3 | 0.5 |

The respective bits of D1 through D4 are checked. When the number of MSB "1" is equal to 0, the addition value is set to "−16" (=−4×4). The reversed DSV is calculated by the value "−16" to the evaluated DSV. The addition value used for this case is indicated in the following TABLE 5.

TABLE 5

| No. of MSB "1" | Addition Value |
| --- | --- |
| 0 | −16 |
| 1 | −8 |
| 2 | 0 |
| 3 | 8 |
| 4 | 16 |

As indicated in the TABLE 5, when the number of MSB "1" is 2 or an even number, the addition value is set to 0 and the correction cannot be performed. It is necessary that the number of MSB "1" is set to any odd number. However, when it is required that the number of MSB "1" is set to any even number, the correction may be performed by fixing only one pit of the MSB and reversing the remaining bits (the number of which becomes an odd number). For example, in the case of FIG. 17(a), only the MSB bits D1 to D3 are reversed for this purpose.

Figure 18:
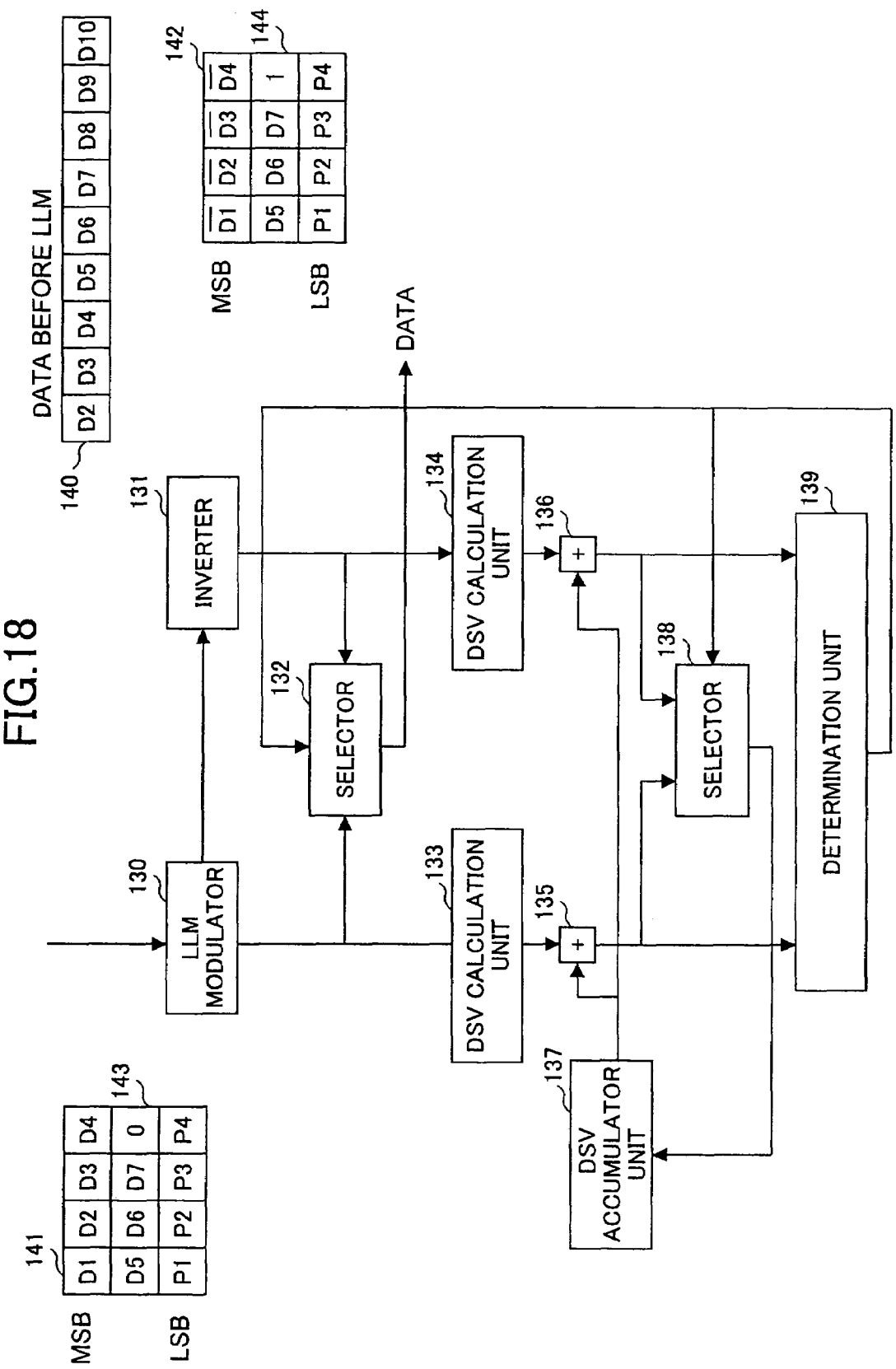
FIG. 18 is a block diagram of the encoding device in the data recording/reproducing device of one preferred embodiment of the invention.

FIG. 18 shows the encoding device in the data recording/reproducing device of one preferred embodiment of the present invention.

As shown in FIG. 18, the encoding device includes an LLM modulator 130, an inverter 131, a selector 132, a first DSV calculation unit 133, a second DSV calculation unit 134, an adder 135, an adder 136, a DSV accumulator unit 137, a selector 138, and a DC-level determination unit 139.

In the encoding device of FIG. 18, the modulator 130 modulates the multi-level data 140 before the modulation into a plurality of multi-level data blocks. The inverter 131 reverses the most significant bit of the data blocks modulated by the modulator 130. The first DSV calculation unit 133 computes the DC level contained in the data block outputted by the modulator 130. The second DSV calculation unit 134 computes the DC level contained in the data block outputted by the inverter 131.

The DSV accumulation unit 137 accumulates the DC levels from the first and second DSV calculation units 133 and 134. The DC-level determination unit 139 determines a smaller one of the DC levels from the first and second DSV calculation units 133 and 134. The selector 132 chooses one of the output data of the modulator 130 or the output data of the inverter 131 based on the output value of the determination unit 139. The selector 138 chooses one of the output data of the adder 135 or the output data of the adder 136 based on the output value of the determination unit 139. The adder 135 outputs a sum of the output data of the DSV calculation unit 133 and the output data of the DSV accumulator unit 137. The adder 136 outputs a sum of the output data of the DSV calculation unit 136 and the output data of the DSV accumulator unit 137.

Next, a description will be given of operation of the encoding device of the present embodiment.

First, the data 140 before the modulation is inputted to the modulator 130, and the modulation data 141 having alpha 143 that is 0 is obtained. The resulting data 141 is inputted to the inverter 131, and the most significant bits (D1-D4) are reversed, and alpha 144 is set to 1 so that the data 142 is obtained.

The respective DSV of the two data 141 and 142 are calculated by the DSV calculation units 133 and 134. The adder 135 outputs the sum of the output data of the DSV calculation unit 133 and the output data of the DSV accumulator unit 137. The adder 136 outputs the sum of the output data of the DSV calculation unit 136 and the output data of the DSV accumulator unit 137.

The determination unit 139 determines the smaller one (that is nearer to 0) of the DC levels from the first and second DSV calculation units 133 and 134. The selector 132 chooses the modulation data based on the output data of the determination unit 139. The selector 138 chooses the DSV accumulation value based on the output data of the determination unit 139. The modulation data selected by the selector 132 is outputted to a subsequent stage device (not shown). The accumulation value selected by the selector 138 is outputted to the DSV accumulator unit 137 as a new accumulation result.

Figure 19:
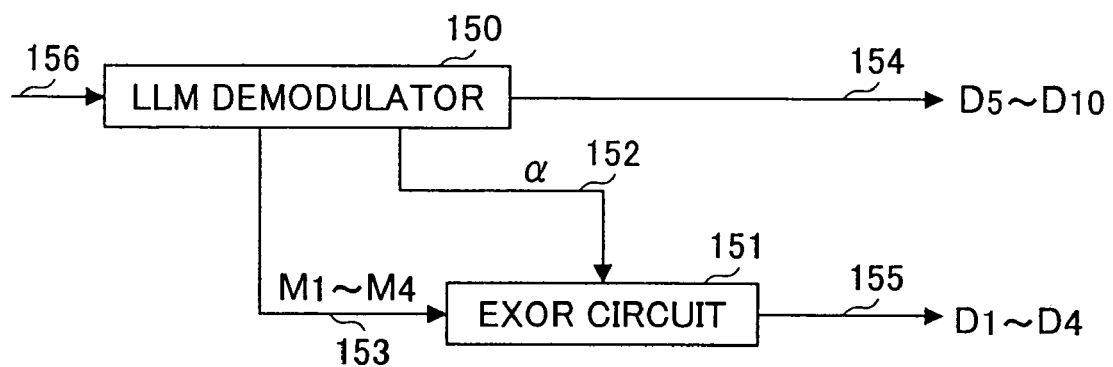
FIG. 19 is a block diagram of the decoding device in the data recording/reproducing device of one preferred embodiment of the invention.

FIG. 19 shows the decoding device in the data recording/reproducing device of one preferred embodiment of the present invention.

As shown in FIG. 19, the decoding device includes an LLM demodulator 150 and an EXOR circuit 151. The demodulator 150 outputs the lower bits of the reconstructed multi-level data through demodulation of the original modulated multi-level data. The EXOR circuit 151 carries out an EXOR logic operation of the most significant bits M1 to M4 of the original modulated multi-level data and the reversal bit alpha thereof so that the EXOR circuit 151 outputs the upper bits of the reconstructed multi-level data.

The reproduction signal obtained from the optical disk is inputted to the demodulator 150 via the input signal 156. As the result of the LLM demodulation, the demodulator 150 outputs the lower bits (D5 to D10) of the reconstructed multi-level data to the output signal line 154. The demodulator 150 delivers the reversal bit alpha of the reproduction signal and the most significant bits M1 to M4 of the reproduction signal to the EXOR circuit 151 via the signal line 152 and the signal line 153, respectively. As the result of the EXOR logic operation, the EXOR circuit 151 outputs the upper bits (D1 to D4) of the reconstructed multi-level data to the output signal line 155.

Figure 20:
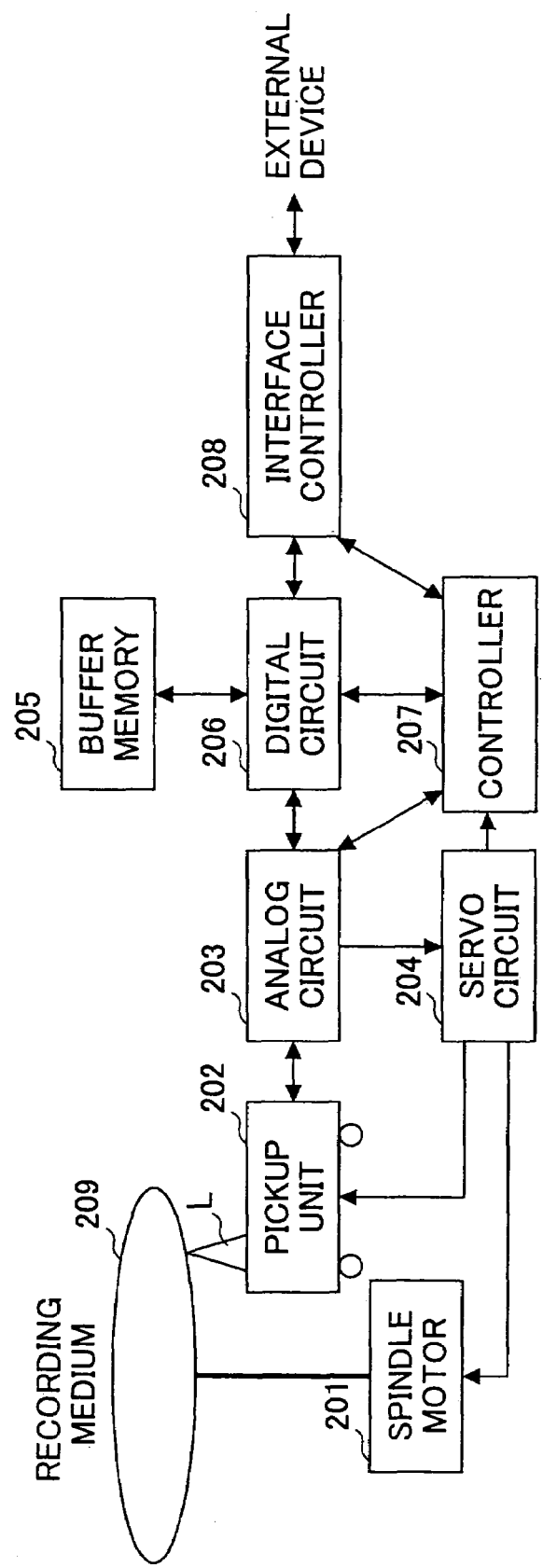
FIG. 20 is a block diagram of an optical disk drive to which an embodiment of the data recording/reproducing device of the invention is applied.

Next, FIG. 20 shows an optical disk drive to which an embodiment of the data recording/reproducing device of the invention is applied.

This optical disk drive incorporates the data recording/reproducing device of the present embodiment for use therein, and it may be the CD-R drive, the CD-RW drive, the CD+RW drive, the DVD-R drive, the DVD-RW drive, the DVD+R drive, the DVD+RW drive, the DVD-RAM drive, the DVD+RAM drive, etc.

In the following description, the optical disk is considered a typical example of a recording medium. However, the present invention is not limited to the optical disk recording/reproducing device, and it is also applicable to other recording/reproducing methods using the magneto-optical recording media, the write-once and read-many media, other rewritable media, etc.

Moreover, the composition of FIG. 20 is the minimum composition required for the description.

The optical disk drive of FIG. 20 includes an optical disk 209, a spindle motor 201, a pickup unit 202, an analog circuit 203, a servo circuit 204, a buffer memory 205, a digital circuit 206, a controller 207, and an interface controller 208. The functions and operation of these components of the optical disk drive in FIG. 20 are essentially the same as those of the corresponding components in FIG. 15, and a description thereof will be omitted.

Figure 21:
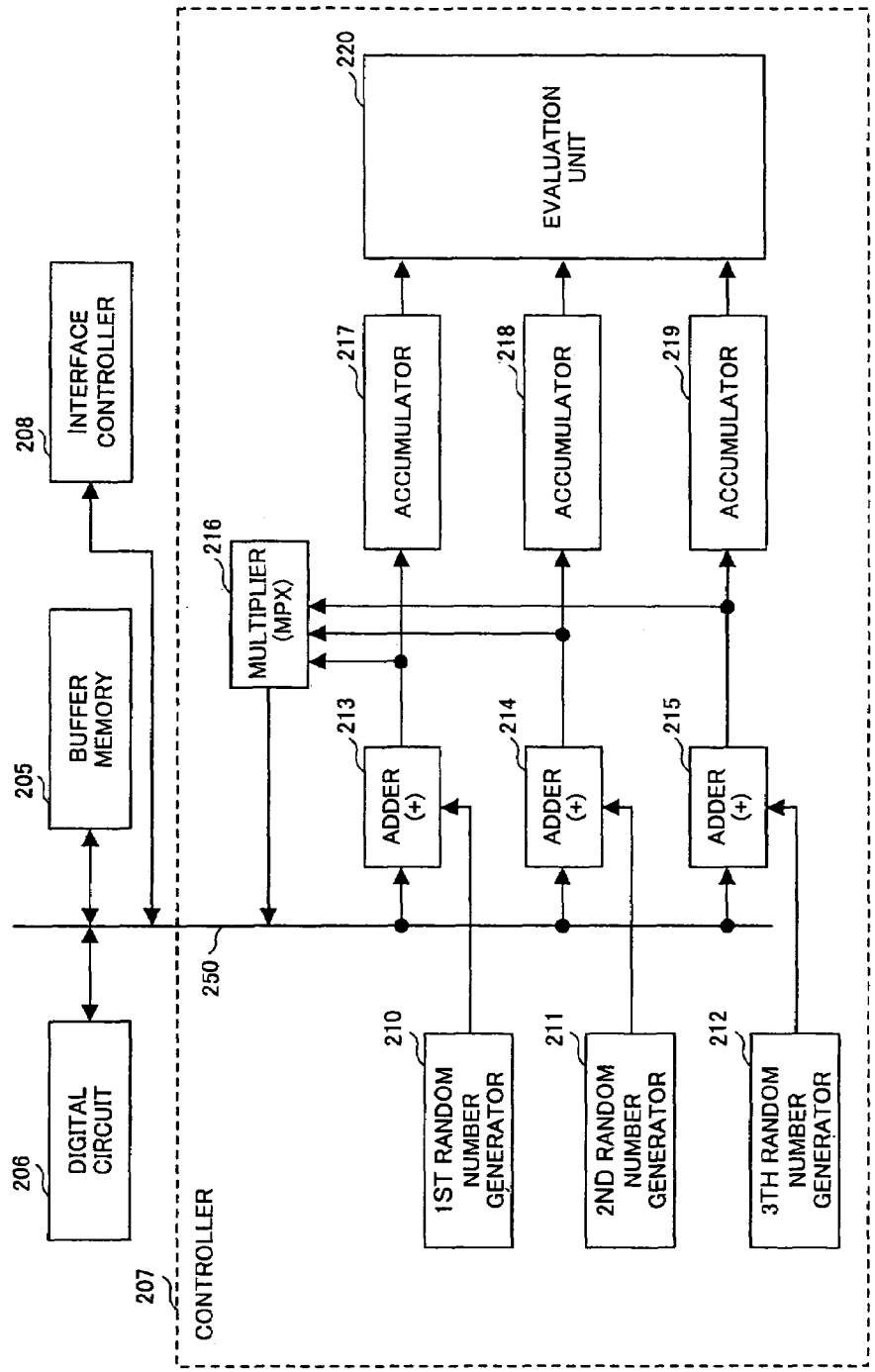
FIG. 21 is a block diagram of one preferred embodiment of the data recording device in the controller of the optical disk drive of FIG. 20.

FIG. 21 shows one preferred embodiment of the data recording device in the controller of the optical disk drive of FIG. 20.

The controller 207 is connected with the digital circuit 206, the buffer memory 205, and the interface controller 208 so that the exchange of data is possible through the data bus 250. The controller 207 includes the first random number generator (the first random-number-generation circuit) 210, the second random number generator (the second random-number-generation circuit) 211, the third random number generator 212, the adders (+) 213-215, the multiplexer (MPX) 216, the accumulation units (accumulation circuit) 217-219, and the evaluation unit 220.

The first random number generator 210, the second random number generator 211, and the third random number generator 212 are equivalent to a random-number-generation unit that generates two or more kinds of random number.

The adders 213-215 are equivalent to an addition unit that adds to the data each random number generated by the random-number-generation unit respectively.

The accumulation units 217-219 are equivalent to an accumulation value holding unit that holds each accumulation value which is determined with each random number added to the data by the addition unit.

The evaluation unit 220 is equivalent to a random number generation unit that chooses the random number from among the random number, based on each accumulation value held by the accumulation value holding unit.

Furthermore, the controller 207, the buffer memory 205, and the MPX 216 function as a recording unit that adds the random number information, indicating the selected random number, to the accumulation value to which the random number chosen by the random number generation unit is added, and records the resulting data to the recording medium.

The data (the information recorded on the optical disk 209) received from the external device is sent to the controller 207 through the data bus 250 by the interface controller 208 at the time of recording of the multi-level data.

Each of the adders 213-215 outputs each sum of the data and each random number generated by the first random number generator 210, the second random number generator 211, and the third random number generator 212, respectively, the random number information indicating each random number is determined, and the accumulation value is calculated.

Each accumulation value (or digital sum value (DSV)) is accumulated in each of the accumulation units 217-219. The random number prepares the three kinds of random-number-generation systems, as shown in FIG. 21, and it generates the random number of the respectively different system.

Next, the evaluation unit 220 compares and evaluates the accumulation value accumulated at each accumulation unit 217-219, and chooses the random number of the random-number-generation system which suppresses the DC level most.

For example, the selection processing asks for all addition, and when the sum total is the octal of 0-7, it chooses the random number near the number twice of the center level 3.5.

Thus, two or more random number are added to the data in the unit which adds the random number, and the random number which evaluates and suppresses the DC level most is adopted.

Next, a description will be given of the multiplexer (MPX) and the data with which the accumulation value to which the random number generated from the random number generator of the random-number-generation system is added, and random number information is added is accumulated to the buffer memory 205. The controller 207 accesses the buffer memory 205 so that the data accumulated is recorded to the optical disk 209.

Therefore, the optical disk 209 is provided in the format to which the random number information indicating the random number is added and recorded on the accumulation value adding the data and the random number.

Thus, the random number with a small amount of information is added and recorded to the data and the data is made reproducible based on the random number when recording the multi-level data to the optical disk, and the occurrence of the servo-band signal can fully be suppressed at the time of data reproduction.

Next, when adding the random number information, the digital circuit 206 carried out the random number generation at the recording medium so that the selected random number is added to the accumulation value in the above-mentioned processing and recording. The error correcting code of the random number information with the selected random number with the error correcting code of the random number information or error detecting code, and the accumulation value to which the selected random number is added are shown.

Figure 22:
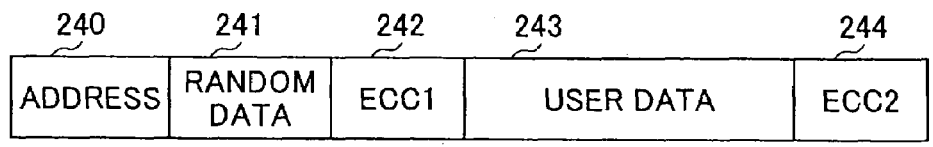
FIG. 22 is a diagram for explaining the data arrangement of one sector of an optical disk.

FIG. 22 is a diagram for explaining the data arrangement of one sector of the optical disk.

In the above-mentioned processing, the random number information 241 indicating the selected random number, and the address 240 are added to the user data 243 equivalent to the accumulation value in which the random number is added to the data (information) received from the external device. In addition, the error correcting code (ECC1) 242 for the random number information 241 is added to such user data. Furthermore, the error correcting code (ECC2) 244 for the whole data (the address 240, the random number information 241, and the error correcting code 242) is added, and such information is recorded to the optical disk 209 as shown in FIG. 22.

Alternatively, it is possible to change the ECC1 or the ECC2 to an error detecting code for the data arrangement of one sector of the optical disk.

The information which indicates what random number is added to the user data 243 is included in the random number information 241. For example, the information, such as the initial value of the random number, is given as the random number information 241.

Thus, by adding the error correcting code or the error detecting code to the random number information, it is possible that the error correcting code or the error detecting code be restored certainly at the time of reproduction, and the reliability of data reproduction can be raised without performing erroneous detection of the random number information.

Next, as for the above-mentioned random number information in the processing of the digital circuit 206, it is preferred to make it the information indicating the initial value of the selected random number. That is, it is preferred that the initial value of the random number which is the information indicating the random number added to the data is the random number information 241 in FIG. 22 in the processing of the digital circuit 206.

Thus, the same random number as the random number generated at the time of data-recording can be certainly reproduced at the time of data reproduction, by recording the initial value of the random number added to the data as the random number information indicating the selected random number.

Next, in the processing of the controller 207, it is possible to make the random number information into the information indicating the initial value of the random number matched to the selected random number. That is, the number indicating the initial value of the random number matched as the information indicating the random number added to the data as the random number information 241 is inputted. This is easily realized by storing the correspondence table of the random number and the initial value of the random number in the controller 207 shown in FIG. 20.

Thus, the amount of information added to the data can be lessened more by using the information indicating the initial value of the random number added to the data as the random number information indicating the selected random number.

Next, when using pseudo-random-number generators (for example, M-sequence pseudo-random number generators) as the first random number generator 210, the second random number generator 211, and the third random number generator 212, the same random number is generated at a fixed period in a cyclic rotational manner.

If the cyclic rotation is taken, the probability of occurrence of all the patterns becomes the same, and it is impossible to prevent the outputting of the low-pass signal.

Then, it is preferred that the first random number generator 210, the second random number generator 211 and the third random number generator 212 are provided to generate generates the random number by the pseudo-random-number method, and the cyclic rotation number of the generated random number is enlarged as compared with the number of the data items.

Thus, the occurrence of the low-pass signal in the servo band can be suppressed by enlarging the cyclic rotation number of the pseudo-random number as compared with the number of the data items.

In the above-described processing, the random number is updated and added for every data item. However, it is possible to update the random number for two or more data items and add the updated random number so as to avoid making the band of the random number into the high frequency components.

Figure 24:
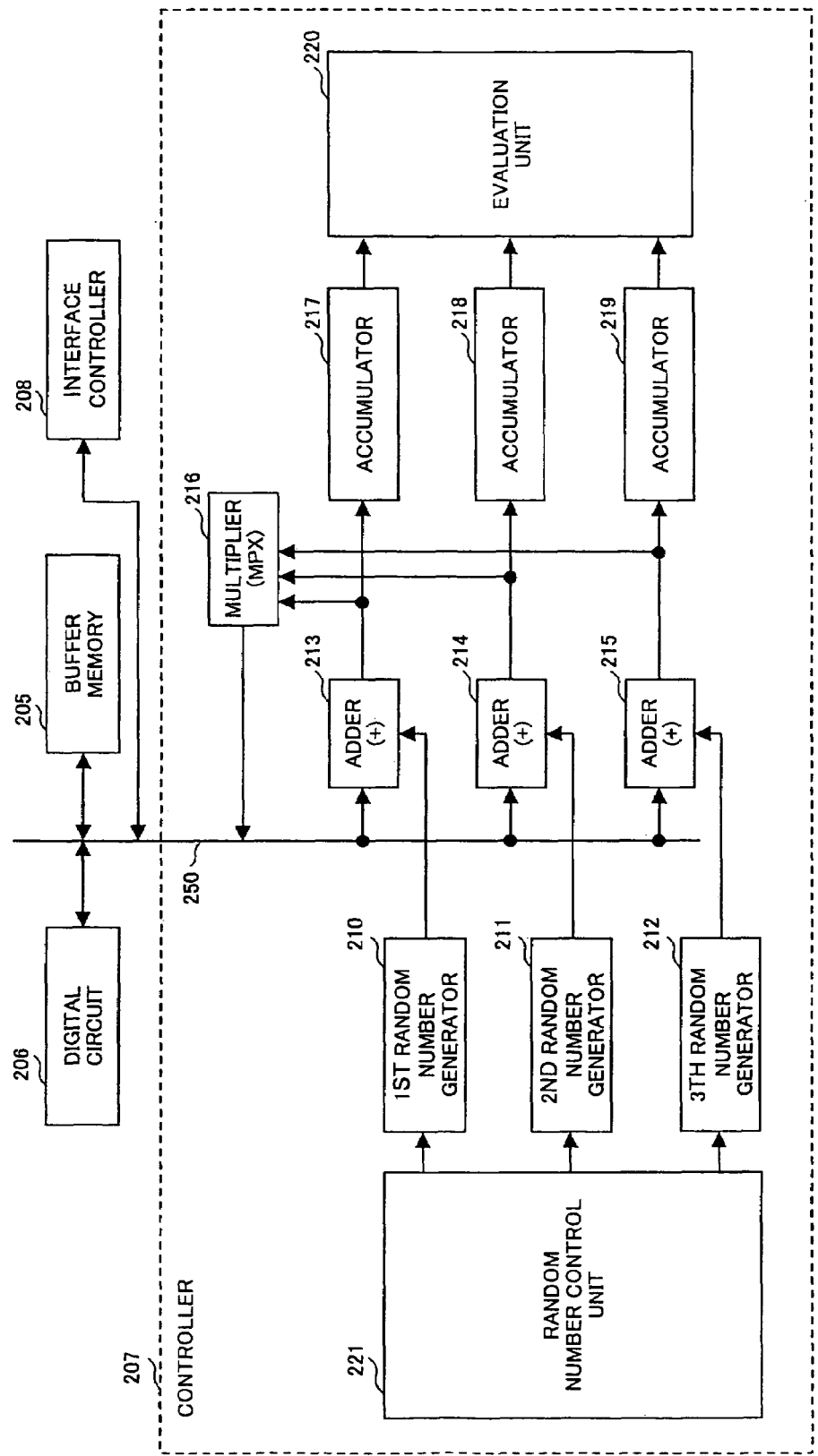
FIG. 24 is a block diagram of another preferred embodiment of the data recording apparatus in the controller of the optical disk drive of FIG. 20.

FIG. 24 shows another preferred embodiment of the data recording apparatus in the controller of the optical disk drive of FIG. 20. In FIG. 24, the elements that are essentially the same as corresponding elements in FIG. 21 are designated by the same reference numerals, and a description thereof will be omitted.

In the controller 207 of FIG. 24, the random number control unit 221 is additionally provided, which controls the timing of each of the first random number generator 210, the second random number generator 211, and the third random number generator 212 to update the random number being outputted.

The random number control unit 221 is provided so that the random number may be updated, for a predetermined number of the data items, to the first random number generator 210, the second random number generator 211, and the third random number generator 212, and the random number control unit 221 functions to update the value of the above-mentioned random number for the predetermined number of the data items.

For example, by controlling to update the random number added every 512 bits of the data which updates the random number added in the above-mentioned processing every 256 bits of the data to be recorded. For example, when the data is recorded, it controls to take the long updating timing of the random number to be added, and the influence of the high frequency components of the random number can be suppressed.

Thus, the occurrence of the signal of the servo band at the time of reproduction can be suppressed well by updating the random number in two or more units of the data to record.

When the same data continues after the selection of the random number, it is possible to avoid outputting the same data in the above-mentioned processing by adding a second pseudo-random number with a cyclic rotation number of the pseudo-random numbers which is smaller than the number of the data items.

Figure 25:
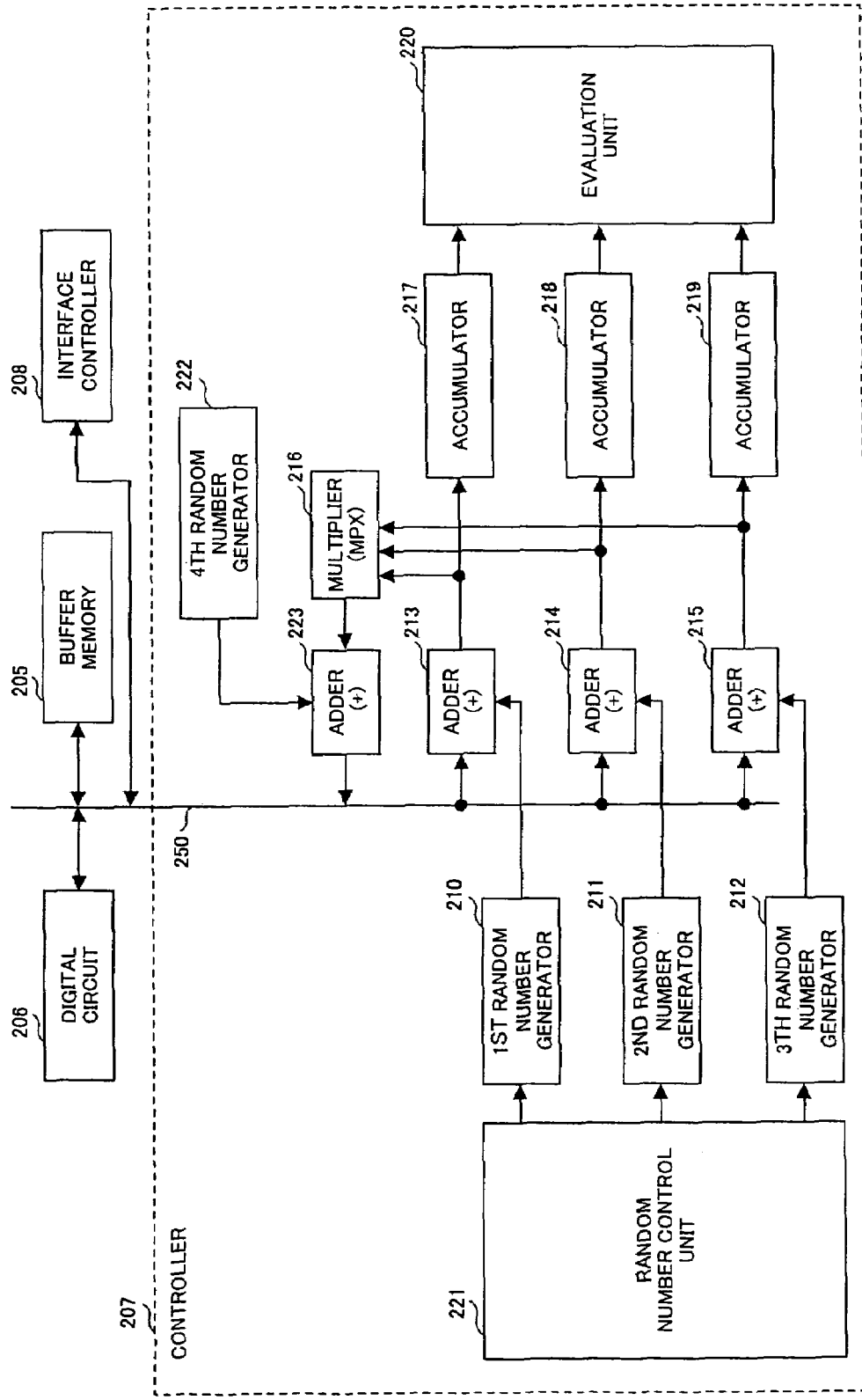
FIG. 25 is a block diagram of another preferred embodiment of the data recording apparatus in the controller of the optical disk drive of FIG. 20.

FIG. 25 shows another preferred embodiment of the data recording apparatus in the controller of the optical disk drive of FIG. 20. In FIG. 25, the elements that are essentially the same as corresponding elements in FIG. 24 or FIG. 21 are designated by the same reference numerals, and a description thereof will be omitted.

In the controller 207 of the present embodiment, the fourth random number generator 222 and the adder 223 are additionally provided, and these components achieves the function of adding a second pseudo-random number with a cyclic rotation number of the pseudo-random numbers which is smaller than the number of the data items.

The cyclic rotation number of the pseudo random numbers serves to generate the small random number compared with the data, and the second pseudo random number from the fourth random number generator 222 is added to the accumulation value to which the selected random number is added by the adder 223, and stores the resulting data in the buffer memory 205.

Therefore, when the suppression of the DC level is inadequate, the DC level can be further suppressed by adding the random number further. Thus, randomization of the data can be performed while suppressing the occurrence of the signal of the servo band by adding the random number redundantly.

Next, the function of the optical disk drive when reproducing the recorded data from the optical disk 209 is explained.

Figure 23:
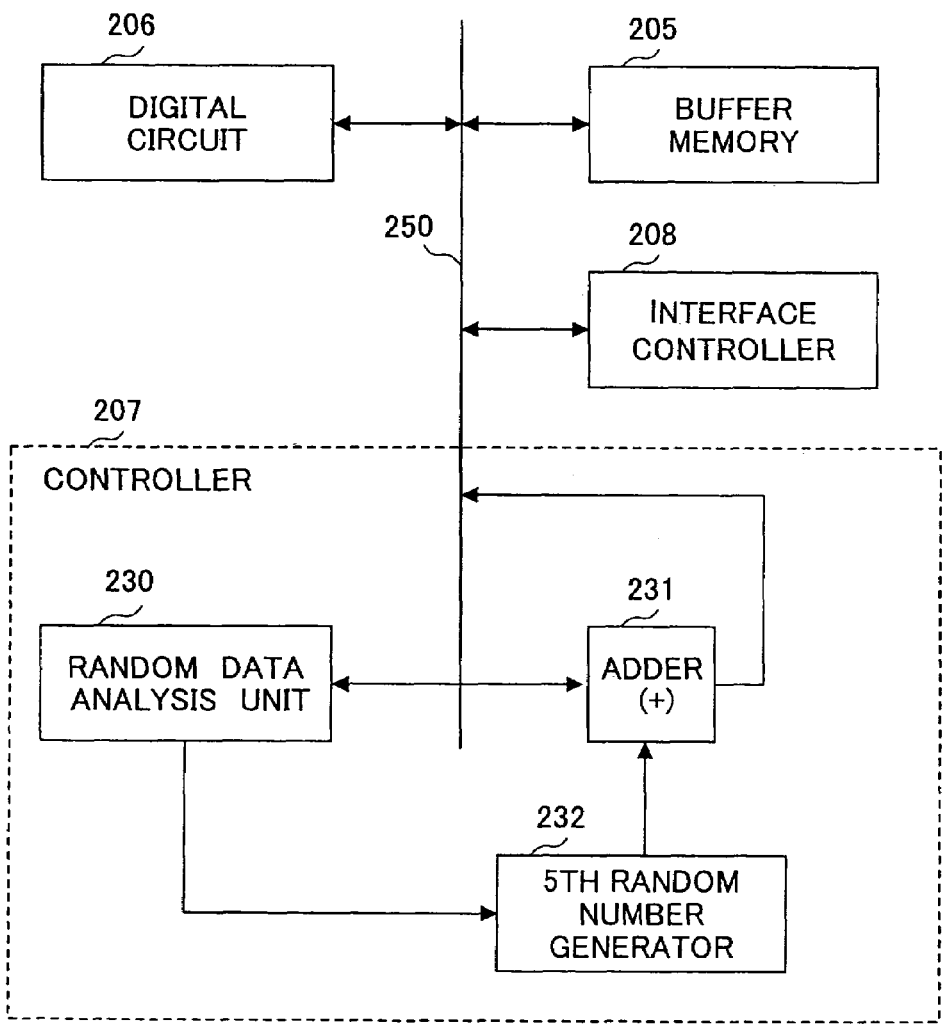
FIG. 23 is a block diagram of one preferred embodiment of the data reproducing device in the controller of the optical disk drive of FIG. 20.

FIG. 23 shows one preferred embodiment of the data reproducing device in the controller of the optical disk drive of FIG. 20.

As shown in FIG. 23, the controller 207 of the present embodiment includes the random data analysis unit 230, the adder 231, and the fifth random number generator 232.

The controller 207 functions as a reading unit that reads, from the recording medium, the accumulation value (which includes the data and the recorded random number) and the random number information (which is added to the accumulation value).

The random data analysis unit 230 and the fifth random number generator 232 achieve the function of determining the random number based on the random number information read by the controller 207. The controller 207 and the adder 231 function to add the determined random number to the accumulation value, so that the function to reproduce the original information is achieved.

At the time of reproduction of the multi-level data from the recording medium, the address 240 the random number information 241, the error correcting code (ECC1) 242, and the error correcting code (ECC2) 244 which is added to the accumulation value (the user data 243) are read out from the optical disk 9, and its accumulation value are read, the error correction of the whole data is performed by using the ECC2, the error correction of the random number information 241 is performed by using the ECC1, and the random number information 241 and the user data 243 are temporarily stored in the buffer memory 205.

Then, the random number information 241 is read out and sent to the random data analysis unit 230. The random data analysis unit 230 analyzes and decodes the random number information 241, and determines the information indicating the initial value of the random number (matched to the information indicating the initial value of the random number) which indicates the random number added to the user data 243, based on the decoding results, and sets the initial value to the fifth random number generator 232.

The fifth random number generator 232 generates the random number based on the initial value, and the random number from the fifth random number generator 232 is added to the user data 243 read from the buffer memory 205 by using the adder 231. Thus, the controller 207 serves to reproduce the original data from the recording medium.

For example, the fifth random number generator 232 generates a random number which negates the random number added to the user data 243, based on the random number information, and the adder 231 outputs a sum of the subsequently generated random number and the user data 243.

The original random number added at the time of data recording is removed. And the user data 243 in which the original random number is removed is transmitted to the external device through the interface controller 208.

Thus, the random number is added to the data read out from the optical disk, and it is possible to avoid the occurrence of the frequency components in the servo band after the modulation of the data, and the original data can be reproduced by removing the original random number.

Figure 26:
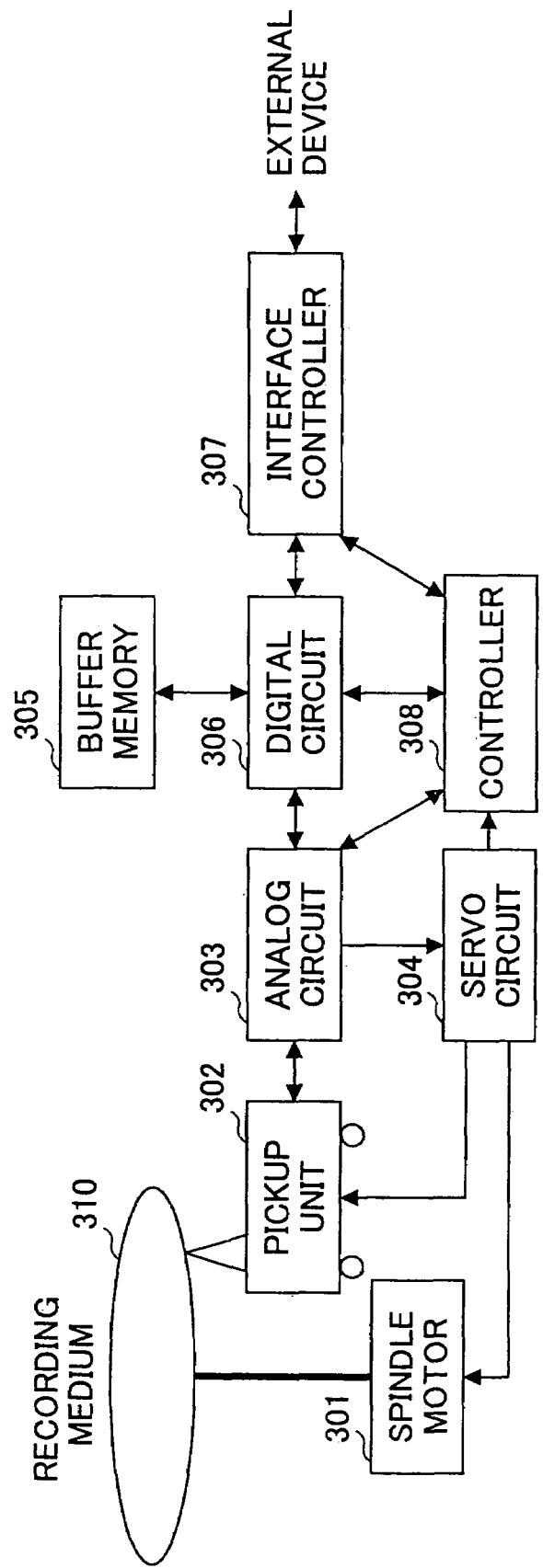
FIG. 26 is a block diagram of an optical disk drive to which one embodiment of the data recording/reproducing device of the invention is applied.

Next, FIG. 26 shows an optical disk drive to which an embodiment of the data recording/reproducing device of the invention is applied.

This optical disk drive incorporates the data recording/reproducing device of the present embodiment for use therein, and it may be the CD-R drive, the CD-RW drive, the CD+RW drive, the DVD-R drive, the DVD-RW drive, the DVD+R drive, the DVD+RW drive, the DVD-RAM drive, the DVD+RAM drive, etc.

In the following description, the optical disk is considered a typical example of a recording medium. However, the present invention is not limited to the optical disk recording/reproducing device, and it is also applicable to other recording/reproducing methods using the magneto-optical recording media, the write-once and read-many media, other rewritable media, etc.

Moreover, the composition of FIG. 26 is the minimum composition required for the description.

The optical disk drive of FIG. 26 includes an optical disk 310, a spindle motor 301, a pickup unit 302, an analog circuit 303, a servo circuit 304, a buffer memory 305, a digital circuit 306, a controller 307, and an interface controller 308. The functions and operation of these components of the optical disk drive in FIG. 26 are essentially the same as those of the corresponding components in FIG. 20, and a description thereof will be omitted.

Figure 27:
FIG. 27 is a diagram for explaining the data recording method using the LLM modulation according to the invention.

FIG. 27 shows the data recording method using the LLM modulation according to the invention.

An example of the data before the LLM modulation indicated by (a) in FIG. 27 will be explained in the case where the 11-bit data (D1-D11) is modulated.

For example, the LLM modulation serves to calculate four sets of 3-bit multi-level data items, indicated by (b) in FIG. 27, from the 11-bit data. Specifically the LLM modulation sets up the four sets of 3-bit multi-level data items as follows. The high-order bit data items (D1-D8) of the original multi-level data before the LLM modulation are arranged to the first and second rows of the new multi-level data items without change, and each of the least significant bits (LSB) P1-P4 of the new multi-level data items are calculated from the data items (D9-D11) of the original multi-level data.

Each value of the 3-bit multi-level data items after the LLM modulation is recorded to the recording medium respectively on the basis of the unit data (3 bits) encircled by the ellipse in FIG. 27(b).

Moreover, the reproduction of the recorded data from the recording medium is performed by computing the optimal value in accordance with the rule of calculation of each of the least significant bits (LSB) P1-P4 of the new multi-level data items.

Next, a description will be given of the method of separating the read-out signal into the frequency components in the data recording/reproducing device.

Figure 28A:
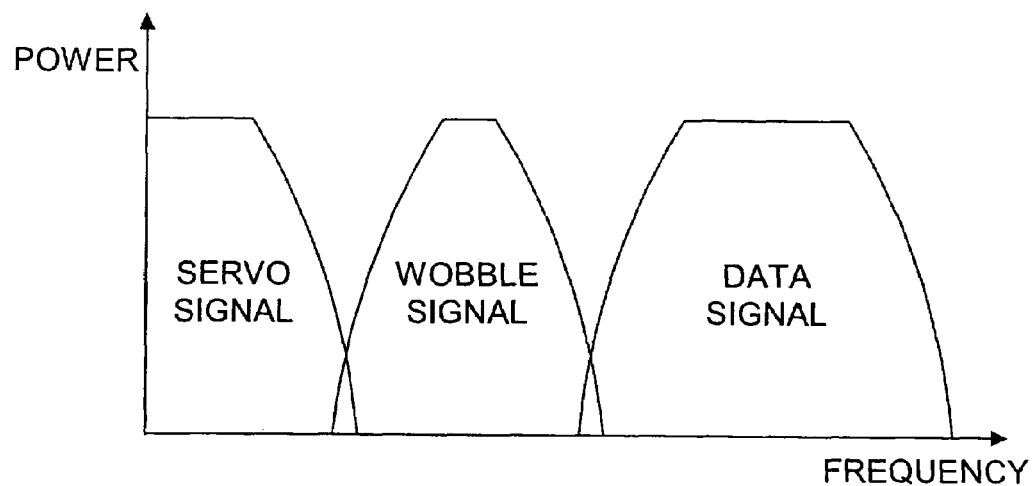
FIG. 28A and FIG. 28B are diagrams for explaining the frequency separation performed by the data recording device in the optical disk drive of FIG. 26.
Figure 28B:
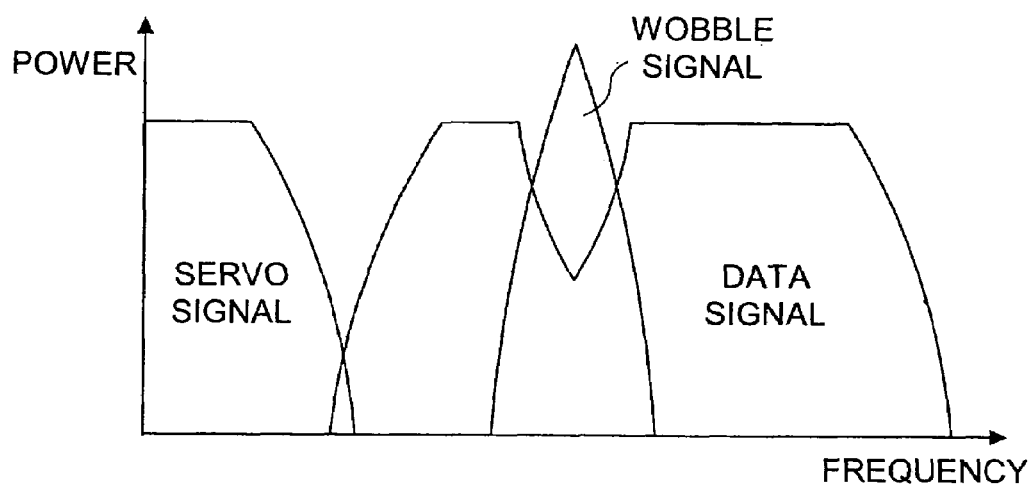

FIG. 28A and FIG. 28B are diagrams for explaining the frequency separation performed by the data recording/reproducing device in the optical disk drive of FIG. 26.

As shown in FIG. 28A, the data signal, the wobble signal and the servo signal are usually separated into frequency components that are distinct from each other.

However, when the frequency separation is performed, the frequency which can be used as the data signal may cause only the high frequency components to occur, and the efficiency is decreased rather than the wobble-signal band.

When the multi-level data is recorded in order for the low-pass signal and the signal around the band to occur mostly, there are many different levels that are to be controlled, and much additional information is required.

When the digital circuit 306 and the controller 308 function to record the information to the optical disk 310 and transform the information into the signal sequence, the modulation is carried out so that the low-pass frequencies of the signal sequence are suppressed and the components of the specific band in the signal sequence are suppressed.

Moreover, the specific band mentioned above is the band of the wobble signal, and the wobble signal includes the signal indicating the address.

Therefore, as shown in FIG. 28B, only the signal components in the band of the wobble signal are suppressed by using the data signal frequencies higher than the servo signal frequencies, and the amount of information carried on the signal can be made to increase.

Thus, the other information is reproducible by suppressing the signal components in the band of the specific frequencies. Moreover, the information on the wobble signal is reproducible by suppressing the signal components in the band of the wobble signal. Furthermore, the address information is reproducible from the wobble signal.

A description will be given of the DC level detection method which is used when the DC level correction is performed.

As shown in FIG. 14A through FIG. 14C, it is supposed that the multi-level data is the eight-level data containing the level corresponding to one of the eight different levels 0 to 7. The DC level correction control is performed so that the median value of the eight-level data is 3.5. In order to simplify the DC level correction control, the evaluated DSV for the respective levels are determined as in the above TABLE 3. The evaluated DSV in the TABLE 3 is added to each of the multi-level data so that the result of the addition is set to zero.

When the multi-level data is recorded to the optical disk, the DSV varies. By using the bit inversion in the read-out signal of the multi-level data, the DSV is set to zero.

A description will be given of the method of controlling the wobble signal frequency.

The optical disk 310 is the recording medium in which two or more first DC levels for the information in the unit are calculated, the first power of the specific frequency component is calculated, and the high order bit of the information on the above unit is reversed. Further, the optical disk 310 is the recording medium in which two or more information which calculates the second reversed DC level and the second power of the specific frequency component is calculated, the one where DC level and the specific frequency component of accumulation are smaller is selected, and the information indicating the level reversal is recorded.

That is, two or more DC levels of the information on the unit and the power of the specific frequency component are calculated. The DC levels are determined when reversing the high order bit of the information on the unit, and the power of the specific frequency component.

The accumulation value of the DC level and the power with both the specific smaller frequency components are chosen. The information on the unit that the identification information indicating the level reversal of the high order bits is added, and the identification information is added is recorded with the selected DC level and the power.

In the above method of controlling the wobble frequency, the digital circuit 306 and the controller 308 function to calculate, on the basis of the unit of two or more data items, the first power of the specific frequency component and reverse the high order bits of the information on the unit is reversed. The digital circuit 306 and the controller 308 function to calculate the reversed second powers, and choose the one where the specific frequency component is smaller, and perform the data recording by adding the information indicating that it is reversed on the unit of two or more data items. By determining the power of the specific frequency based on the discrete-Fourier-transform method, the components of the wobble frequency are calculated from the signal components, and the control is carried out so that the power becomes the minimum.

For example, what is necessary is just to perform the discrete Fourier transformation (DFT) when the wobble frequency becomes one period with the 32-bit multi-level data. That is, if the data is set to a sequence of D0-D31, the power P can be calculated by performing the data processing based on the following formulas (1) to (3).

In this case, the data D0-D31 are selected from the values shown in the above TABLE 3.

$$\mathrm{Re} = \sum_{n=0}^{31} (-\sin(2\pi/32) \times n \times Dn) \quad (1)$$

$$\mathrm{Im} = \sum_{n=0}^{31} (-\cos(2\pi/32) \times n \times Dn) \quad (2)$$

$$P = \sqrt{\mathrm{Re}^2 + \mathrm{Im}^2} \quad (3)$$

Thus, it is possible to suppress the specific frequency component by performing the high order bit reversing or not performing it. Moreover, the specific frequency components can be calculated by using the DFT. Furthermore, it is possible to reproduce certainly the information recorded on the optical disk with the suppression of the DC components and the specific frequency components by performing the high order bit reversing or not performing it.

Next, a description will be given of the processing which controls the DC level and the wobble signal band by reversing the information in the information record regenerative apparatus shown in FIG. 26.

The digital circuit 306 and the controller 308 function to calculate, on the basis of the unit of two or more data items of the information obtained from the recording medium, the first DC level and the first power of the specific frequency component. Further, the second DC levels, which are made to reverse the high order bits of the information on the plurality units, and the second power of the specific frequency components are calculated. The smaller one of the DC levels and the specific frequency components of the accumulation results for the plural units of the information is selected.

Figure 29:
FIG. 29 is a diagram for explaining the bit inversion performed by the data recording device in the optical disk drive of FIG. 26.

FIG. 29 is a diagram for explaining the bit inversion which is performed by the data recording device in the optical disk drive of FIG. 26.

Here, an example of the data before the LLM modulation indicated by (a) in FIG. 29 will be explained in the case where the 10-bit data (D1-D10) is modulated.

For example, the LLM modulation acts to calculate four sets of 3-bit multi-level data items indicated by (b) in FIG. 29, from the 10-bit data. Specifically the LLM modulation sets up the four sets of 3-bit multi-level data items. The high-order bit data items (D1-D7) of the original multi-level data before the LLM modulation are arranged in the first and second rows of the new multi-level data items without change, and the least significant bits (LSB) P1-P4 of the new multi-level data items are calculated from the data items (D8-D10) of the original multi-level data.

And "F" is used as the bit for the identification information indicating whether it is reversed. For example, when F=1, all the high order bits are reversed. Hence, the two kinds of patterns are generated for the case where F is 1 and the case where F is 0, each evaluation value DSV and P are calculated, and the result added to the accumulation value of the evaluation value DSV adopt the data of the smaller one.

Thus, it is possible to suppress the DC components and the specific frequency component by whether the high order bit is reversed or it does not carry out.

Moreover, the digital circuit 306 and the controller 308 may be provided so that the smaller one of the sum of the square of the DC levels and the square of the specific powers accumulated in the above-mentioned processing is selected, and the information indicating that the bit is reversed is recorded for the plural units of the data.

Namely, the smaller one of the performance criterion Eval is chosen by using the performance criterion "Eval" which is calculated based on the data processing according to the following formula (4).

Thus, the smaller one can be chosen by taking the square sum of the DC component and the power of specific frequency.

$$Eval = P^2 + DSV^2 = Re^2 + Im^2 + DSV^2 \quad (4)$$

Alternatively, the digital circuit 306 and the controller 308 may be provided in a different manner so that the smaller one of the sum of the square of the DC levels and a coefficient multiplied with the square of the specific powers in the above-mentioned processing is selected, and the information indicating that the bit is reversed is recorded for the plural units of the data.

Namely, the smaller one of the performance criterion Eval is chosen by using the performance criterion "Eval" which is calculated based on the data processing according to the following formula (5). Thus, the smaller one can be chosen by taking the sum of the square of the DC component and the coefficient α multiplied by the square of the power of specific frequency.

$$Eval = P^2 + \alpha \times DSV^2 = Re^2 + Im^2 + \alpha \times DSV^2 \qquad (5)$$

By setting the coefficient α to a suitable value, the main control may be performed for either the DC component or the power of specific frequency.

The digital circuit 306 and the controller 308 in one preferred embodiment of the invention are provided so that a data length of each of the plural units of the data used in the above-mentioned processing is set to be less than ½ of a data length of the signal sequence corresponding to one period of the specific frequency. The unit on which the bit reversing is performed must be less than ½ of one period of the wobble signal frequency because the suppression of the wobble signal frequency is impossible if the data length of the plural units of the information is set to be larger than ½ of the wobble signal frequency.

The digital circuit 306 and the controller 308 in one preferred embodiment of the invention are provided so that the data length used in the calculation of the power of the specific frequency is set to be larger than the data length of each of the plurality units of the data. In other words, the data length that is longer than the length of the data unit with which the bit reversing is performed is needed in order to determine the power of the wobble signal frequency.

Next, a description will be given of one preferred embodiment of the data reproducing device in the optical disk drive of FIG. 26.

Figure 30:
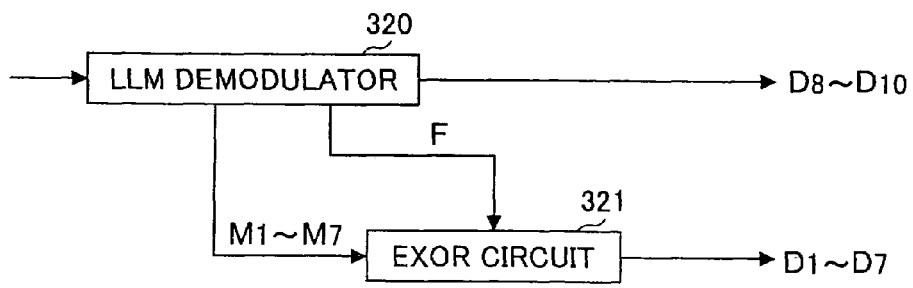
FIG. 30 is a block diagram of the data reproducing device in the optical disk drive of FIG. 26.

FIG. 30 shows the data reproducing device in the optical disk drive of FIG. 26.

As shown in FIG. 30, the data reproducing device of the present embodiment includes an LLM demodulator 320 and an EXOR circuit 321. The demodulator 320 outputs the lower bits of the reconstructed multi-level data through demodulation of the original modulated multi-level data. The EXOR circuit 321 carries out an EXOR logic operation of the higher order bits M1 to M7 of the original modulated multi-level data and the reversal bit F thereof so that the EXOR circuit 321 outputs the upper bits of the reconstructed multi-level data.

The reproduction signal obtained from the optical disk is inputted to the demodulator 320 via the input signal. As the result of the LLM demodulation, the demodulator 320 outputs the lower bits (D8 to D10) of the reconstructed multi-level data to the output signal line. The demodulator 320 delivers the reversal bit F of the reproduction signal and the higher order bits M1 to M7 of the reproduction signal to the EXOR circuit 321, respectively. As the result of the EXOR logic operation, the EXOR circuit 321 outputs the upper bits (D1 to D7) of the reconstructed multi-level data to the output signal line.

The present invention is not limited to the above-described embodiments, and variations and modifications may be made without departing from the scope of the present invention.

Further, the present invention is based on Japanese priority application No. 2002-306263, filed on Oct. 21, 2002, Japanese priority application No. 2002-306802, filed on Oct. 22, 2002, Japanese priority application No. 2002-336901, filed on Nov. 20, 2002, and Japanese priority application No. 2003-037817, filed on Feb. 17, 2003, the entire contents of which are hereby incorporated by reference.

What is claimed is:

1. A data recording device which records a multi-level data to a recording medium, comprising:
a modulator modulating the multi-level data into two or more data blocks;
an inverter reversing a most significant bit of each data block output from the modulator; a first DC level calculation unit computing a DC level in each data block output from the modulator;
a second DC level calculation unit computing a DC level in each data block output from the inverter;
a DC level accumulation unit outputting a selected one of the DC level from the first DC level calculation unit and the DC level from the second DC level calculation unit; and
a level determination unit determining an accumulated sum value of each DC level of the first and second DC level calculation units and the selected DC level of the accumulation unit, wherein the level determination unit causing a selected one of the modulator and the inverter to output a corresponding data block as an output data block, based on a result of comparison of a first accumulated sum value of the DC level of the first DC level calculation unit and the accumulation unit and a second accumulated sum value of the DC level of the second DC level calculation unit and the accumulation unit, and the level determination unit outputting a selected one of the first and second accumulated sum values to the accumulation unit as a new selected DC level, based on the result of comparison.

2. The data recording device according to claim 1 wherein the level determination unit is provided to selectively output a smaller one of the first and second accumulated sum values to the accumulation unit as a new selected DC level, based on the result of comparison.

3. The data recording device according to claim 1 wherein the level determination unit is provided to determine whether the most significant bit of the corresponding data block is reversed by using another bit of the corresponding data block other than the most significant bit when the output of the modulator or the inverter is selected as the output data block based on the result of comparison.

4. The data recording device according to claim 1 wherein the second DC level calculation unit is provided to compute a DC level by making reference to a most significant bit and a DC level of the corresponding data block before the bit reversing.

5. The data recording device according to claim 1 wherein the data recording device is provided to generate an odd number of data blocks when the modulator modulates the multi-level data into the two or more data blocks.

6. The data recording device according to claim 1 wherein the data recording device is provided to fix one of the most significant bits of the two or more data blocks when the modulator modulates the multi-level data into an even number of data blocks.

7. The data recording device according to claim 1 wherein the respective data blocks modulated by the modulator are provided such that each data block include a number of bits having one of upper bits of the multi-level data before the modulation as a most significant bit of the data block, and a least significant bit of the data block generated from lower bits of the multi-level data before the modulation.

8. A data recording device according to claim 1, which reproduces multi-level data from the recording medium, further comprising:

a demodulator transforming the multi-level data obtained from the recording medium, into an output multi-level data, the output multi-level data including a reversal bit indicating whether a most significant bit of the multi-level data is reversed; and an output unit outputting a most significant bit of the output multi-level which is reversed again, and outputting remaining bits of the output multi-level data without change when the reversal bit indicates that the most significant bit is reversed.

* * * * *